US012359376B2

(12) United States Patent
Wang et al.

(10) Patent No.: US 12,359,376 B2
(45) **Date of Patent: *Jul. 15, 2025**

(54) CREPED FIBROUS STRUCTURES

(71) Applicant: The Procter & Gamble Company, Cincinnati, OH (US)

(72) Inventors: Fei Wang, Mason, OH (US); Douglas Jay Barkey, Salem Township, OH (US); James Allen Cain, Albany, NY (US); Stephen John Delvecchio, Cincinnati, OH (US); Angela Marie Leimbach, Hamilton, OH (US); Kun Piao, Deerfield Township, OH (US); James Kenneth Comer, West Chester, OH (US); Ryan Dominic Maladen, Anderson Township, OH (US); Atiya Jordan-Brown, Lebanon, OH (US); David Warren Loebker, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 298 days.

This patent is subject to a terminal disclaimer.

(21) Appl. No.: 17/936,535

(22) Filed: Sep. 29, 2022

(65) Prior Publication Data

US 2023/0027102 A1 Jan. 26, 2023

Related U.S. Application Data

(63) Continuation of application No. 16/938,123, filed on Jul. 24, 2020, now Pat. No. 11,486,097, which is a continuation of application No. 15/792,824, filed on Oct. 25, 2017, now Pat. No. 10,745,865.

(60) Provisional application No. 62/489,007, filed on Apr. 24, 2017, provisional application No. 62/412,455, filed on Oct. 25, 2016.

(51) Int. Cl.

| | |
|---|---|
| ***D21H 27/02*** | (2006.01) |
| ***B31F 1/12*** | (2006.01) |
| ***D21F 1/10*** | (2006.01) |
| ***D21F 5/04*** | (2006.01) |
| ***D21F 5/18*** | (2006.01) |
| ***D21F 9/02*** | (2006.01) |
| ***D21F 11/00*** | (2006.01) |
| ***D21H 21/14*** | (2006.01) |
| ***D21H 25/00*** | (2006.01) |
| ***D21H 27/00*** | (2006.01) |
| ***D21H 27/40*** | (2006.01) |
| *B31F 1/16* | (2006.01) |
| *D21F 3/04* | (2006.01) |
| *D21G 3/00* | (2006.01) |
| *D21H 21/20* | (2006.01) |

(52) U.S. Cl.

CPC .............. *D21H 27/02* (2013.01); *D21F 1/10* (2013.01); *D21F 5/048* (2013.01); *D21F 5/181* (2013.01); *D21F 9/02* (2013.01); *D21F 11/006* (2013.01); *D21H 21/146* (2013.01); *D21H 25/005* (2013.01); *D21H 27/002* (2013.01); *D21H 27/004* (2013.01); *D21H 27/005* (2013.01); *D21H 27/007* (2013.01); *D21H 27/008* (2013.01); *D21H 27/40* (2013.01); *B31F 1/126* (2013.01); *B31F 1/16* (2013.01); *D21F 3/045* (2013.01); *D21F 5/188* (2013.01); *D21G 3/005* (2013.01); *D21H 21/20* (2013.01)

(58) Field of Classification Search

CPC .... D21H 27/02; D21H 21/146; D21H 25/005; D21H 27/002; D21H 27/004; D21H 27/005; D21H 27/007; D21H 27/008; D21H 27/40; D21H 21/20; D21F 1/10; D21F 5/048; D21F 5/181; D21F 9/02; D21F 11/006; D21F 3/045; D21F 5/188; B31F 1/126; B31F 1/16; B31F 1/07; D21G 3/005

See application file for complete search history.

(56) References Cited

U.S. PATENT DOCUMENTS

| | | | |
|---|---|---|---|
| 2,742,823 | A | 4/1956 | Compton |
| 2,834,828 | A | 5/1958 | Ebel |
| 2,946,725 | A | 7/1960 | Norris |
| 3,070,510 | A | 12/1962 | Cooley |
| 3,111,127 | A | 11/1963 | Jarboe |
| 3,535,421 | A | 10/1970 | Briner |
| 3,538,230 | A | 11/1970 | Pader |

(Continued)

FOREIGN PATENT DOCUMENTS

| | | | |
|---|---|---|---|
| CA | 2567189 | A1 | 12/2005 |
| DE | 102006032233 | A1 | 1/2008 |

(Continued)

OTHER PUBLICATIONS 1,8-Cineole Causes Comfortable Cooling Sensationby Concomitant Application With MentholIFSCC 2011 Conference Proceeding Book IFSCC pp. 226-231, 2011.

(Continued)

*Primary Examiner* — Jose A Fortuna
(74) *Attorney, Agent, or Firm* — Richard L. Alexander

(57) ABSTRACT

Creped fibrous structures having pillows and knuckles, wherein the creped fibrous structures may exhibit improved knuckle properties, such as Knuckle Roughness Ra, Knuckle Roughness Rq, and Knuckle Creping Frequency and methods for making same are provided, and/or may comprise elongate knuckles comprising discrete pillows and/or elongate pillows between first and second elongate knuckles.

12 Claims, 19 Drawing Sheets

(56) References Cited

U.S. PATENT DOCUMENTS

| | | | |
|---|---|---|---|
| 3,678,154 | A | 7/1972 | Widder |
| 3,862,307 | A | 1/1975 | Di Giulio |
| 3,917,613 | A | 11/1975 | Humbert et al. |
| 3,991,178 | A | 11/1976 | Humbert et al. |
| 4,029,759 | A | 6/1977 | Humbert et al. |
| 4,051,234 | A | 9/1977 | Gieske |
| 4,070,496 | A | 1/1978 | Rowsell et al. |
| 4,136,163 | A | 1/1979 | Watson |
| 4,150,052 | A | 4/1979 | Watson |
| 4,153,679 | A | 5/1979 | Rowsell |
| 4,157,384 | A | 6/1979 | Browning |
| 4,178,459 | A | 12/1979 | Rowsell |
| 4,206,215 | A | 6/1980 | Bailey |
| 4,230,688 | A | 10/1980 | Rowsell |
| 4,340,583 | A | 7/1982 | Wason |
| 4,459,425 | A | 7/1984 | Amano |
| 4,514,345 | A | 4/1985 | Johnson et al. |
| 4,966,754 | A | 10/1990 | Purohit et al. |
| 5,004,597 | A | 4/1991 | Majeti |
| 5,180,577 | A | 1/1993 | Polefka |
| 5,266,592 | A | 11/1993 | Grub et al. |
| 5,281,410 | A | 1/1994 | Lukacovic |
| 5,322,689 | A | 6/1994 | Hughes et al. |
| 5,328,565 | A | 7/1994 | Rasch et al. |
| 5,399,412 | A | 3/1995 | Sudall et al. |
| 5,451,404 | A | 9/1995 | Furman |
| 5,503,715 | A | 4/1996 | Trokhan et al. |
| 5,578,293 | A | 11/1996 | Prencipe |
| 5,589,160 | A | 12/1996 | Rice |
| 5,603,920 | A | 2/1997 | Rice |
| 5,608,119 | A | 3/1997 | Amano et al. |
| 5,628,876 | A | 5/1997 | Ayers et al. |
| 5,637,194 | A | 6/1997 | Ampulski et al. |
| 5,651,958 | A | 7/1997 | Rice |
| 5,658,553 | A | 8/1997 | Rice |
| 5,703,123 | A | 12/1997 | Pelzer et al. |
| 5,714,041 | A | 2/1998 | Ayers et al. |
| 5,716,601 | A | 2/1998 | Rice |
| 5,725,865 | A | 3/1998 | Mane et al. |
| 5,843,466 | A | 12/1998 | Mane et al. |
| 5,904,811 | A | 5/1999 | Ampulski et al. |
| 5,977,166 | A | 11/1999 | Greenberg |
| 6,117,270 | A | 9/2000 | Trokhan |
| 6,193,847 | B1 | 2/2001 | Trokhan |
| 6,197,288 | B1 | 3/2001 | Mankoo |
| 6,335,180 | B1 | 1/2002 | Julius et al. |
| 6,365,215 | B1 | 4/2002 | Grainger et al. |
| 6,451,844 | B1 | 9/2002 | Watkins et al. |
| 6,464,831 | B1 | 10/2002 | Trokhan et al. |
| 6,592,884 | B2 | 7/2003 | Hofmann et al. |
| 6,660,129 | B1 | 12/2003 | Cabell et al. |
| 6,673,844 | B2 | 1/2004 | Kumamoto et al. |
| 6,790,629 | B2 | 9/2004 | Julius et al. |
| 6,867,009 | B2 | 3/2005 | Cortright et al. |
| 6,884,903 | B2 | 4/2005 | Lorenz et al. |
| 6,890,567 | B2 | 5/2005 | Nakatsu et al. |
| 6,956,139 | B2 | 10/2005 | Green et al. |
| 7,094,320 | B1 | 8/2006 | Phan |
| 7,097,991 | B2 | 8/2006 | Julius et al. |
| 7,128,809 | B2 | 10/2006 | Vinson et al. |
| 7,132,000 | B2 | 11/2006 | Muerner et al. |
| 7,166,195 | B2 | 1/2007 | Hawes |
| 7,186,803 | B2 | 3/2007 | Dubin et al. |
| 7,189,760 | B2 | 3/2007 | Erman et al. |
| 7,465,581 | B2 | 12/2008 | Bevan et al. |
| 7,691,229 | B2 | 4/2010 | Vinson et al. |
| 7,914,649 | B2 | 3/2011 | Ostendorf et al. |
| 7,915,207 | B2 | 3/2011 | Herdt et al. |
| 7,919,624 | B2 | 4/2011 | Baraldi et al. |
| D672,966 | S | 12/2012 | Sheehan et al. |
| 8,461,145 | B2 | 6/2013 | Gijsen et al. |
| 8,506,759 | B2 | 8/2013 | Spitzer et al. |
| 8,569,505 | B2 | 10/2013 | Codd et al. |
| 8,592,621 | B2 | 11/2013 | Ley et al. |
| 9,044,429 | B2 | 6/2015 | Bakes et al. |
| 9,340,914 | B2 | 5/2016 | Manifold et al. |
| 9,427,415 | B2 | 8/2016 | Sreekrishna et al. |
| 9,937,115 | B2 | 4/2018 | Haught et al. |
| 10,538,881 | B2 | 1/2020 | Wang et al. |
| 10,745,864 | B2 * | 8/2020 | Wang .................. D21H 27/004 |
| 10,745,865 | B2 * | 8/2020 | Wang .................. D21H 21/146 |
| 11,162,224 | B2 | 11/2021 | Wang et al. |
| 11,486,097 | B2 * | 11/2022 | Wang .................. D21H 27/008 |
| 2002/0119231 | A1 | 8/2002 | Kumamoto et al. |
| 2003/0044573 | A1 | 3/2003 | Rasch et al. |
| 2003/0203196 | A1 | 10/2003 | Trokhan |
| 2004/0052735 | A1 | 3/2004 | Nakatsu et al. |
| 2004/0084167 | A1 | 5/2004 | Vinson et al. |
| 2004/0187226 | A1 | 9/2004 | Muerner et al. |
| 2005/0238701 | A1 | 10/2005 | Kleinwaechter |
| 2005/0245407 | A1 | 11/2005 | Ishihara |
| 2005/0266435 | A1 | 12/2005 | Hackos et al. |
| 2006/0013837 | A1 | 1/2006 | Haines |
| 2006/0029628 | A1 | 2/2006 | Kleinwaechter |
| 2006/0088697 | A1 | 4/2006 | Manifold et al. |
| 2006/0154886 | A1 | 7/2006 | Weihe et al. |
| 2006/0204466 | A1 | 9/2006 | Littau et al. |
| 2007/0036733 | A1 | 2/2007 | Spence et al. |
| 2007/0137812 | A1 | 6/2007 | Shannon et al. |
| 2007/0190090 | A1 | 8/2007 | Brown |
| 2007/0297993 | A1 | 12/2007 | Kindel et al. |
| 2008/0153845 | A1 | 6/2008 | Palmer et al. |
| 2008/0175801 | A1 | 7/2008 | Ramji |
| 2008/0245498 | A1 | 10/2008 | Ostendorf et al. |
| 2008/0311054 | A1 | 12/2008 | Natsch |
| 2009/0081153 | A1 | 3/2009 | Scott et al. |
| 2009/0098213 | A1 | 4/2009 | Tran |
| 2009/0131302 | A1 | 5/2009 | Pasricha et al. |
| 2009/0175882 | A1 | 7/2009 | Patapoutian et al. |
| 2010/0119779 | A1 | 5/2010 | Ostendorf et al. |
| 2010/0183524 | A1 | 7/2010 | Zielinski et al. |
| 2010/0278991 | A1 | 11/2010 | Haught et al. |
| 2010/0297400 | A1 | 11/2010 | Mellin et al. |
| 2010/0314059 | A1 | 12/2010 | Edwards et al. |
| 2010/0316615 | A1 | 12/2010 | Kurreck et al. |
| 2011/0077275 | A1 | 3/2011 | Zielinski et al. |
| 2011/0104301 | A1 | 5/2011 | Ahern et al. |
| 2011/0124666 | A1 | 5/2011 | Gijsen et al. |
| 2011/0178181 | A1 | 7/2011 | Bakes et al. |
| 2011/0311345 | A1 | 12/2011 | Mcneil |
| 2012/0082628 | A1 | 4/2012 | Haught |
| 2012/0088774 | A1 | 4/2012 | Grahek et al. |
| 2012/0121737 | A1 | 5/2012 | Vielhaber et al. |
| 2013/0143001 | A1 | 6/2013 | Manifold et al. |
| 2013/0315843 | A1 | 11/2013 | Haught et al. |
| 2013/0319625 | A1 | 12/2013 | Mohammadi et al. |
| 2014/0050675 | A1 | 2/2014 | Zielinski et al. |
| 2015/0176216 | A1 | 6/2015 | Ostendorf et al. |
| 2015/0176218 | A1 | 6/2015 | Maladen et al. |
| 2015/0176220 | A1 | 6/2015 | Ostendorf et al. |
| 2015/0225903 | A1 | 8/2015 | Jeannot et al. |
| 2015/0272907 | A1 | 10/2015 | Sreekrishna et al. |
| 2015/0330030 | A1 | 11/2015 | Dwiggins |
| 2015/0352801 | A1 | 12/2015 | Margo Moreno |
| 2016/0090692 | A1 | 3/2016 | Eagles et al. |
| 2016/0090693 | A1 | 3/2016 | Eagles et al. |
| 2016/0090698 | A1 | 3/2016 | Sze et al. |
| 2016/0145809 | A1 | 5/2016 | Hermans et al. |
| 2016/0158136 | A1 | 6/2016 | Haught et al. |
| 2016/0331659 | A1 | 11/2016 | Sreekrishna et al. |
| 2018/0112357 | A1 | 4/2018 | Wang et al. |
| 2018/0112361 | A1 | 4/2018 | Wang et al. |
| 2018/0280562 | A1 | 10/2018 | Salaam-Zayid et al. |
| 2020/0109520 | A1 | 4/2020 | Wang et al. |
| 2020/0354896 | A1 * | 11/2020 | Wang ....................... D21F 9/02 |
| 2022/0064866 | A1 | 3/2022 | Wang et al. |
| 2022/0178076 | A1 | 6/2022 | Wang et al. |
| 2023/0027102 | A1 * | 1/2023 | Wang .................... D21F 11/006 |

FOREIGN PATENT DOCUMENTS

| | | | |
|---|---|---|---|
| EP | 310299 | | 4/1989 |
| EP | 1217106 | A1 | 6/2002 |
| EP | 1600151 | B1 | 8/2008 |

(56) References Cited

FOREIGN PATENT DOCUMENTS

| | | | | |
|---|---|---|---|---|
| JP | 2006065044 | A | 3/2006 | |
| JP | 2011136953 | A | 7/2011 | |
| JP | 2011205975 | A | 10/2011 | |
| JP | 2012062304 | A | 3/2012 | |
| JP | 2012080840 | A | 4/2012 | |
| WO | 0135768 | A1 | 5/2001 | |
| WO | 2004043169 | A1 | 5/2004 | |
| WO | 2005049553 | A1 | 6/2005 | |
| WO | 2006103401 | A2 | 10/2006 | |
| WO | 2009087242 | A2 | 7/2009 | |
| WO | 2011019342 | A2 | 2/2011 | |
| WO | 2011034868 | A1 | 3/2011 | |
| WO | 2013176897 | A2 | 11/2013 | |
| WO | WO-2018081192 | A1 * | 5/2018 | ............... D21F 1/10 |

OTHER PUBLICATIONS

15000 PCT Search Report and Written Opinion for PCT/US2017/058176 dated Jan. 29, 2018, 11 Pages.
All Office Actions, U.S. Appl. No. 15/792,811, filed Oct. 25, 2017.
All Office Actions; U.S. Appl. No. 15/792,816, filed Oct. 25, 2017.
All Office Actions; U.S. Appl. No. 16/707,256, filed Dec. 9, 2019.
All Office Actions; U.S. Appl. No. 16/938,123, filed Jul. 24, 2020.
All Office Actions; U.S. Appl. No. 17/500,628, filed Oct. 13, 2021.
All Office Actions; U.S. Appl. No. 17/521,174, filed Nov. 8, 2021.
All Office Actions; U.S. Appl. No. 15/792,824, filed Oct. 25, 2017.
All Office Actions; U.S. Appl. No. 15/792,821, filed Oct. 25, 2017.
An-Guo Ying,et al., "Green and efficient aza-Michael additions of aromatic amines toα, β-unsaturated ketones catalyzed by DBU based task-specific ionicliquids without solvent" 11 pages.
Chambers et al. "Measuring Intracellular Calcium Fluxes in High Throughput Mode", Combinatorial Chemistry & High Throughput Screening, 2003, 6, D£S. 355-362.
Database GNPD [Online]; Mintel; Feb. 28, 2009 (Feb. 28, 2009), Anonymous: "Whitening mouthwash", retrieved from : YY.~.YLW. mLfQP.}, Databaseaccession No. 1051335.
Fischer et al., "Direct Evidence For Functional TRPVI/TRP AI Heteromers", Pfluegers Archiv (2014), 466 (12), pp. 2229-2241.
Gunthorpe Martin J et al: 11 Peripheral TRPV1 receptors as targets for drug development: new molecules andmechanisms 11, Current Pharmaceutical Design, Benthamscience Publishers Ltd, NL, vol. 14, No. I, Jan. 1, 2008 (Jan. 1, 2008), pp. 32-41,XP002498636,ISSN: 1873-4286, DOI:10.2174/138161208783330754* p. 32 ** figures 2, 3 *.
John. Read: "Recent Progress in the Menthone Chemistry", Chemical Reviews, vol. 7, No. 1, Mar. 1, 1930 (Mar. 1, 1930), pp. 1-50, XP055113072, ISSN: 0009-2665, 001: 10.1021 1 cr60025a001.
Joris Vriens, Giovanni Appendino, and Bernd Nilius, "Pharmacology of Vanilloid Transient Receptor Potential Cation Channels", Molecularpharmacology, vol. 75 No. 6 Mar. 18, 2009 pp. 1262-1279.
Lam, "Activation of recombinant human TRPV1 receptors expressed in SH-SY5Y human neuroblastoma cells increases [Cali, initiates neurotransmitter release and promotesdelayed cell death.", Journal of neurochemistry, 102, pp. 801-811, 2007.
Michele C. Jetter, Mark A Youngman, James J. McNally, Sui-Po Zhang, Adrienne E. Dubin, Nadia Nasserb and Scott L. Dax. N-Isoquinolin-5-yl-N'-aralkyl-urea and -amideantagonists of human vanilloid receptor 1. Bioorganic & Medicinal Chemistry Letters14 (2004) 3053-3056.
Mihara et al. "The role of flavor and fragrance chemicals inTRPA1 (transient receptor potential cation channel, member A1) activity associated with allergies" dated 2015, 12 pages.
Mitchell, Jennifer E. et al. "Expression and characterization of the intracellular vanilloid receptor (TRPVI) in bronchi from patients with chronic cough", ExperimentalLung Research, vol. 31, No. 3, Apr. 1, 2005, pp. 295-306.
Patricia M. W. Lam, Atticus H. Hainsworth, Graham D. Smith, Davina E. Owen, James Davies and David 0. Lambert. Activation of recombinant human TRPVI receptorsexpressed in SH-SY5Y human neuroblastoma cells increases [Ca2 +]i, initiatesneurotransmitter release and promotes delayed cell death. Journal ofNeurochemistry,2007' 102, 801-811.
Pier Giovanni Baraldi et al: "Transient Receptor Potential Ankyrin 1 (TRPAI) Channel as Emerging Target for NovelAnalgesics and Anti-Inflammatory Agents", Journal of Medicinal Chemistry,vol. 53, No. 14, Jul. 22, 2010 (Jul. 22, 2010), pp. 5085-5107, XP055031281,ISSN: 0022-2623, DOI: 10.1021/jml00062h* p. 5085-p. 5086 ** p. 5093, right-hand column *.
Sadofsky, Laura R. et al., "Unique Responses are Observed in Transient Receptor Potential Ankyrin 1 and Vanilloid 1 (TRPAI and TRPVI) Co-Expressing Cells.", Cells2014, vol. 3, No. 2, 2014, pp. 616-626.
Sadofsky, LR et al. "Characterisation of a HEK293 cell line permanently coexpressing the cough receptors Transient Receptor Potential Ankyrin 1 and V anilloid 1(TRPAI and TRPVI)", Pulmomary Pharmacology & Therapeutics, Academic Press, GB, vol. 24, No. 3, Jun. 1, 2010, p. e8.
Sreekrishna et al., "Modulation Of Transient Receptor Potential (TRP) Channels By Chinese Herbal Extracts", Pulmonary Pharmacology & Therapeutics, 2010, 24(3),p. 8.
Takaishi et al., "1,8-cineole, a TRPM8 agonist, is a novel natural antagonistof human TRPA1", Molecular pain, 8 (86), pp. 1-12, Jan. 1, 2012 (Jan. 1, 2012).
Yansong, Zhang et al. "Modulation of Transient Receptor Potential (TRP) Channels by Chinese Herbal Extracts", Phytotherapy Research, vol. 25, No. 11, Mar. 23, 2011, pp. 1666-1670.
All Office Actions; U.S. Appl. No. 18/614,851, filed Mar. 25, 2024.
Unpublished U.S. Appl. No. 18/614,851, filed Mar. 25, 2024, to Fei Wang et al.

* cited by examiner

CREPED FIBROUS STRUCTURES

CROSS REFERENCE TO RELATED APPLICATIONS

This application is a continuation of, and claims priority under 35 U.S.C. § 120 to, U.S. patent application Ser. No. 16/938,123, filed on Jul. 24, 2020, which is now granted U.S. Pat. No. 11,486,097, issued Nov. 1, 2022, which is a continuation of U.S. patent application Ser. No. 15/792,824, filed on Oct. 25, 2017, which is now granted U.S. Pat. No. 10,745,865, issued Aug. 18, 2020, which claims the benefit, under 35 USC § 119 (e), of U.S. Provisional Patent Application Ser. No. 62/489,007, filed on Apr. 24, 2017 and U.S. Provisional Patent Application Ser. No. 62/412,455, filed Oct. 25, 2016, the entire disclosures of which are fully incorporated by reference herein.

FIELD OF THE INVENTION

The present invention relates to creped fibrous structures comprising pillows and knuckles, and more particularly, to creped fibrous structures, such as sanitary tissue products.

BACKGROUND OF THE INVENTION

Creped fibrous structures comprising pillows and knuckles are known in the art. However, such knuckles within the known creped fibrous structures have exhibited different, for example inferior, knuckle properties.

It has been found that consumers of creped fibrous structures that comprise knuckles that exhibit known knuckle properties desire improved knuckle properties, such as Knuckle Roughness Ra, Knuckle Roughness Rq, and/or Knuckle Creping Frequency. Such improved knuckle properties result in one or more improved creped fibrous structure properties, such as softness, strength, absorbency, cleaning, flexibility, and/or compressibility.

It has been found that the 3D patterns of the known fibrous structures, for example as shown in FIGS. 1A and 1B, which illustrates a patterned molding member 10 that imparts a 3D pattern of semi-continuous pillow and semi-continuous knuckles to a fibrous structure fails to retain sufficient Surface Void Volume during use by consumers to provide consumer desirable cleaning performance after bowel movements. As shown in FIGS. 1A and 1B, the known patterned molding member comprises a molding member 10, for example a through-air-drying belt. The molding member 10 comprises a plurality of semi-continuous knuckles formed by semi-continuous line segments of resin arranged in a non-random, repeating pattern, for example a substantially machine direction repeating pattern of semi-continuous lines supported on a support fabric ("reinforcing member") comprising filaments 4. In this case, the semi-continuous lines are curvilinear, for example sinusoidal. The semi-continuous knuckles 20 (white areas in FIG. 1A) are spaced from adjacent semi-continuous knuckles 20 by semi-continuous pillows 18 (black areas of FIG. 1A), which constitute deflection conduits into which portions of a fibrous structure ply being made on the molding member 10 of FIGS. 1A and 1B deflect. The resulting fibrous structure being made on the molding member 10 of FIGS. 1A and 1B comprises semi-continuous pillow regions imparted by the semi-continuous pillows of the molding member 10 of FIGS. 1A and 1B and semi-continuous non-pillow regions, for example semi-continuous knuckle regions imparted by the semi-continuous knuckles of the molding member 10 of FIGS. 1A and 1B. The semi-continuous pillow regions and semi-continuous knuckle regions may exhibit different densities, for example, one or more of the semi-continuous knuckle regions may exhibit a density that is greater than the density of one or more of the semi-continuous pillow regions.

One problem with known creped fibrous structures is that the known creped fibrous structures exhibit knuckle properties that are higher than what consumers desire.

Accordingly, there is a need for a creped fibrous structure, such as a sanitary tissue product, that exhibits knuckle properties that are lower than knuckle properties of known creped fibrous structures.

BRIEF DESCRIPTION OF THE DRAWINGS

The above-mentioned and other features and advantages of the present disclosure, and the manner of attaining them, will become more apparent and the disclosure itself will be better understood by reference to the following description of non-limiting embodiments of the disclosure taken in conjunction with the accompanying drawings, wherein.

DETAILED DESCRIPTION

Figure 1A:
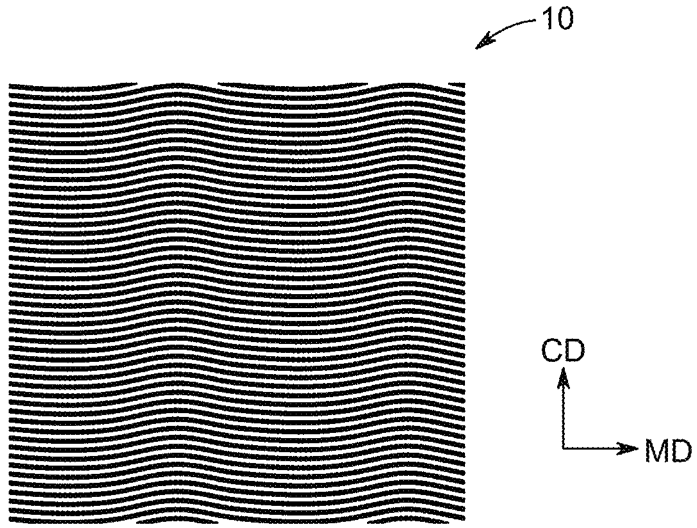
Fig. 1A PRIOR ART
FIG. 1A is a schematic representation of an example of a Prior Art molding member that imparts a 3D pattern to a fibrous structure.

Various non-limiting embodiments of the present disclosure will now be described to provide an overall understanding of the principles of the structure, function, manufacture, and use of the fibrous structures disclosed herein. One or more examples of these non-limiting embodiments are illustrated in the accompanying drawings. Those of ordinary skill in the art will understand that the fibrous structures described herein and illustrated in the accompanying drawings are non-limiting example embodiments and that the scope of the various non-limiting embodiments of the present disclosure are defined solely by the claims. The features illustrated or described in connection with one non-limiting embodiment can be combined with the features of other non-limiting embodiments. Such modifications and variations are intended to be included within the scope of the present disclosure.

Fibrous structures such as paper towels, bath tissues and facial tissues are typically made in a "wet laying" process in which a slurry of fibers, usually wood pulp fibers, is deposited onto a forming wire and/or one or more papermaking belts such that an embryonic fibrous structure can be formed, after which drying and/or bonding the fibers together results in a fibrous structure. Further processing the fibrous structure can be carried out such that a finished fibrous structure can be formed. For example, in typical papermaking processes, the finished fibrous structure is the fibrous structure that is wound on the reel at the end of papermaking, and can subsequently be converted into a finished product (e.g., a sanitary tissue product) by ply-bonding and embossing, for example. In general, the finished product can be converted "wire side out" or "fabric side out" which refers to the orientation of the sanitary tissue product during manufacture. That is, during manufacture, one side of the fibrous structure faces the forming wire, and the other side faces the papermaking belt, such as the papermaking belt disclosed herein.

The wet-laying process can be designed such that the finished fibrous structure has visually distinct features produced in the wet-laying process. Any of the various forming wires and papermaking belts utilized can be designed to leave a physical, three-dimensional impression in the finished paper. Such three-dimensional impressions are well known in the art, particularly in the art of "through air drying" (TAD) processes, with such impressions often being referred to a "knuckles" and "pillows." Knuckles are typically relatively high density regions corresponding to the "knuckles" of a papermaking belt, i.e., the filaments or resinous structures that are raised at a higher elevation than other portions of the belt. Likewise, "pillows" are typically relatively low density regions formed in the finished fibrous structure at the relatively uncompressed regions between or around knuckles. Further, the knuckles and pillows in a fibrous structure can exhibit a range of densities relative to one another.

Thus, in the description below, the term "knuckles" or "knuckle region," or the like can be used for either the raised portions of a papermaking belt or the densified portions formed in the paper made on the papermaking belt, and the meaning should be clear from the context of the description herein. Likewise "pillow" or "pillow region" or the like can be used for either the portion of the papermaking belt between, within, or around knuckles (also referred to in the art as "deflection conduits" or "pockets"), or the relatively uncompressed regions between, within, or around knuckles in the paper made on the papermaking belt, and the meaning should be clear from the context of the description herein. In general, knuckles or pillows can each be either continuous, semi-continuous or discrete, as described herein.

Knuckles and pillows in paper towels and bath tissue can be visible to the retail consumer of such products. The knuckles and pillows can be imparted to a fibrous structure from a papermaking belt in various stages of production, i.e., at various consistencies and at various unit operations during the drying process, and the visual pattern generated by the pattern of knuckles and pillows can be designed for functional performance enhancement as well as to be visually appealing. Such patterns of knuckles and pillows can be made according to the methods and processes described in U.S. Pat. No. 6,610,173, issued to Lindsay et al. on Aug. 26, 2003, or U.S. Pat. No. 4,514,345 issued to Trokhan on Apr. 30, 1985, or U.S. Pat. No. 6,398,910 issued to Burazin et al. on Jun. 4, 2002, or US Pub. No. 2013/0199741; published in the name of Stage et al. on Aug. 8, 2013. The Lindsay, Trokhan, Burazin and Stage disclosures describe belts that are representative of papermaking belts made with cured polymer on a woven reinforcing member, of which the present invention is an improvement. But further, the present improvement can be utilized as a fabric crepe belt as disclosed in U.S. Pat. No. 7,494,563, issued to Edwards et al. on Feb. 24, 2009 or U.S. Pat. No. 8,152,958, issued to Super et al. on Apr. 10, 2012, as well as belt crepe belts, as described in U.S. Pat. No. 8,293,072, issued to Super et al on Oct. 23, 2012. When utilized as a fabric crepe belt, a papermaking belt of the present invention can provide the relatively large recessed pockets and sufficient knuckle dimensions to redistribute the fiber upon high impact creping in a creping nip between a backing roll and the fabric to form additional bulk in conventional wet press processes. Likewise, when utilized as a belt in a belt crepe method, a papermaking belt of the present invention can provide the fiber enriched dome regions arranged in a repeating pattern corresponding to the pattern of the papermaking belt, as well as the interconnected plurality of surround areas to form additional bulk and local basis weight distribution in a conventional wet press process.

An example of a papermaking belt structure of the type useful in the present invention and made according to the disclosure of U.S. Pat. No. 4,514,345. As shown, the papermaking belt can include cured resin elements forming knuckles on a woven reinforcing member. The reinforcing member can be made of woven filaments as is known in the art of papermaking belts, including resin coated papermaking belts. The papermaking belt structure includes discrete knuckles and a continuous deflection conduit, or pillow region. The discrete knuckles can form densified knuckles in the fibrous structure made thereon; and, likewise, the continuous deflection conduit, i.e., pillow region, can form a continuous pillow region in the fibrous structure made thereon. The knuckles can be arranged in a pattern described with reference to an X-Y plane, and the distance between knuckles in at least one of X or Y directions can vary according to the present invention disclosed herein. In general, the X-Y plane also corresponds to the machine direction, MD, and cross machine direction, CD, of a papermaking belt.

A second way to provide visually perceptible features to a fibrous structure like a paper towel or bath tissue is embossing. Embossing is a well known converting process in which at least one embossing roll having a plurality of discrete embossing elements extending radially outwardly from a surface thereof can be mated with a backing, or anvil, roll to form a nip in which the fibrous structure can pass such that the discrete embossing elements compress the fibrous structure to form relatively high density discrete elements in the fibrous structure while leaving uncompressed, or substantially uncompressed, relatively low density continuous or substantially continuous network at least partially defining or surrounding the relatively high density discrete elements.

Embossed features in paper towels and bath tissues can be visible to the retail consumer of such products. As a result, the visual pattern generated by the pattern of knuckles and pillows can be designed to be visually appealing. Such patterns are well known in the art, and can be made according to the methods and processes described in US Pub. No. US 2010-0028621 A1 in the name of Byrne et al. or US 2010-0297395 A1 in the name of Mellin, or U.S. Pat. No. 8,753,737 issued to McNeil et al. on Jun. 17, 2014.

In an embodiment, a fibrous structure of the present invention has a pattern of knuckles and pillows imparted to it by a papermaking belt having a corresponding pattern of knuckles and pillows that provides for superior product performance and can be visually appealing to a retail consumer.

In an embodiment, a fibrous structure of the present invention has a pattern of knuckles and pillows imparted to it by a papermaking belt having a corresponding pattern of knuckles and an emboss pattern, which together with the knuckles and pillows provides for an overall visual appearance that is appealing to a retail consumer.

In an embodiment, a fibrous structure of the present invention has a pattern of knuckles and pillows imparted to it by a papermaking belt having a corresponding pattern of knuckles, an emboss pattern, which together with the knuckles and pillows provides for an overall visual appearance that is appealing to a retail consumer, and exhibits superior product performance over known fibrous structures.

"Fibrous structure" as used herein means a structure that comprises one or more fibers. Paper is a fibrous structure. Nonlimiting examples of processes for making fibrous structures include known wet-laid papermaking processes and air-laid papermaking processes, and embossing and printing processes. Such processes typically comprise the steps of preparing a fiber composition in the form of a suspension in a medium, either wet, more specifically aqueous medium, or dry, more specifically gaseous (i.e., with air as medium). The aqueous medium used for wet-laid processes is oftentimes referred to as a fiber slurry. The fibrous suspension is then used to deposit a plurality of fibers onto a forming wire or papermaking belt such that an embryonic fibrous structure can be formed, after which drying and/or bonding the fibers together results in a fibrous structure. Further processing the fibrous structure can be carried out such that a finished fibrous structure can be formed. For example, in typical papermaking processes, the finished fibrous structure is the fibrous structure that is wound on the reel at the end of papermaking, and can subsequently be converted into a finished paper product (e.g., a sanitary tissue product).

The fibrous structures of the present disclosure can exhibit a basis weight of greater than about 15 g/m$^2$ (9.2 lbs/3000 ft$^2$) to about 120 g/m$^2$ (73.8 lbs/3000 ft$^2$), alternatively from about 15 g/m$^2$ (9.2 lbs/3000 ft$^2$) to about 110 g/m$^2$ (67.7 lbs/3000 ft$^2$), alternatively from about 20 g/m$^2$ (12.3 lbs/3000 ft$^2$) to about 100 g/m$^2$ (61.5 lbs/3000 ft$^2$), and alternatively from about 30 g/m$^2$ (18.5 lbs/3000 ft$^2$) to about 90 g/m$^2$ (55.4 lbs/3000 ft$^2$) as measured according to the Basis Weight Test Method. In addition, the sanitary tissue products and/or the fibrous structures of the present disclosure can exhibit a basis weight between about 40 g/m$^2$ (24.6 lbs/3000 ft$^2$) to about 120 g/m$^2$ (73.8 lbs/3000 ft$^2$), alternatively from about 50 g/m$^2$ (30.8 lbs/3000 ft$^2$) to about 110 g/m$^2$ (67.7 lbs/3000 ft$^2$), alternatively from about 55 g/m$^2$ (33.8 lbs/3000 ft$^2$) to about 105 g/m$^2$ (64.6 lbs/3000 ft$^2$), and alternatively from about 60 g/m$^2$ (36.9 lbs/3000 ft$^2$) to about 100 g/m$^2$ (61.5 lbs/3000 ft$^2$) as measured according to the Basis Weight Test Method.

The fibrous structures of the present disclosure can be in the form of sanitary tissue product, including rolled sanitary tissue product. Sanitary tissue product rolls can comprise a plurality of connected, but perforated sheets of one or more fibrous structures, that are separably dispensable from adjacent sheets, such as is known for paper towels and bath tissue, which are both considered sanitary tissue products in roll form. Bath tissue, also referred to as toilet paper, can be generally distinguished from paper towels by the absence of permanent wet strength chemistry. Bath tissue can have temporary wet strength chemistry applied thereto.

The fibrous structures of the present disclosure can comprises additives such as softening agents, temporary wet strength agents (i.e. FennoRez glyozalated polyacrylamide), permanent wet strength agents, bulk softening agents, lotions, silicones, wetting agents, latexes, especially surface-pattern-applied latexes, dry strength agents such as KYMENER wet strength additive, polyamido-amine-epichlorhydrin (PAE), carboxymethylcellulose and starch, and other types of additives suitable for inclusion in and/or on sanitary tissue products and/or fibrous structures.

"Machine Direction" or "MD" as used herein means the direction on a web corresponding to the direction parallel to the flow of a fibrous web or fibrous structure through a fibrous structure making machine.

"Cross Machine Direction" or "CD" as used herein means a direction perpendicular to the Machine Direction in the plane of the web.

"Pillow" as used herein means a portion of a fibrous structure formed into the fibrous structure as a result of deflection into a deflection cell of a collection device, for example a papermaking belt and/or fabric. A pillow may be continuous, semi-continuous, or discrete. Within a fibrous structure more than one type (continuous, semi-continuous, and discrete) and/or more than one size and more than one height of pillows may exist. Pillows are typically relatively low density portions within the fibrous structure.

"Knuckle" as used herein means the remaining portion or portions of a fibrous structure that has not been formed by deflection into a deflection cell. In other words, the remaining portion or portions of the fibrous structure that are not pillows. For purposes of the present invention, a transition region that connects a pillow to a knuckle is considered a part of the knuckle.

"Relatively low density" as used herein means a portion of a fibrous structure having a density that is lower than a relatively high density portion of the fibrous structure. Typically, the pillows of the fibrous structures of the present invention are relatively low density compared to the knuckles of the fibrous structure.

"Relatively high density" as used herein means a portion of a fibrous structure having a density that is higher than a relatively low density portion of the fibrous structure. Typically, the knuckles of the fibrous structures of the present invention are relatively high density compared to the pillows of the fibrous structure.

"Substantially semi-continuous" or "semi-continuous" region refers an area on a sheet of sanitary tissue product which has "continuity" in at least one direction parallel to the first plane, but not all directions, and in which area one can connect any two points by an uninterrupted line running entirely within that area throughout the line's length. Semi-continuous knuckles, for example, may have continuity only in one direction parallel to the plane of a papermaking belt. Minor deviations from such continuity may be tolerable as long as those deviations do not appreciably affect the performance of the fibrous structure.

"Substantially continuous" or "continuous" region refers to an area within which one can connect any two points by an uninterrupted line running entirely within that area throughout the line's length. That is, the substantially continuous region has a substantial "continuity" in all directions parallel to the plane of a papermaking belt and is terminated only at edges of that region. The term "substantially," in conjunction with continuous, is intended to indicate that while an absolute continuity is preferred, minor deviations from the absolute continuity may be tolerable as long as those deviations do not appreciably affect the performance of the fibrous structure (or a molding member) as designed and intended.

"Discontinuous" or "discrete" regions or zones refer to areas that are separated from one another areas or zones that are discontinuous in all directions parallel to the first plane.

"Discrete deflection cell" also referred to a "discrete pillow" means a portion of a papermaking belt or fibrous structure defined or surrounded by a substantially continuous knuckle portion.

"Discrete raised portion" means a discrete knuckle, i.e., a portion of a papermaking belt or fibrous structure defined or surrounded by, or at least partially defined or surrounded by, a substantially continuous pillow region.

"Pillow Height" as used herein means the height of a pillow measured using a scanning electron microscope (SEM) to image a surface of fibrous structure and/or sanitary tissue product from which two or more pillows' heights may be determined.

"Differential Pillow Height" means that a first pillow within a fibrous structure exhibits a pillow height of at least 50% greater than a pillow height at least one other pillow within the fibrous structure.

"Roll Bulk" as used herein is the volume of paper divided by its mass on the wound roll. Roll Bulk is calculated by multiplying pi (3.142) by the quantity obtained by calculating the difference of the roll diameter squared in cm squared ($cm^2$) and the outer core diameter squared in cm squared ($cm^2$) divided by 4, divided by the quantity sheet length in cm multiplied by the sheet count multiplied by the Bone Dry Basis Weight of the sheet in grams (g) per cm squared ($cm^2$).

"Bulk Building Capability" as used herein is the bulk height of a specific zone in a single-ply fibrous structure divided by its basis weight (gsm) of that specific zone. Bulk height of a specific zone in a fibrous structure is the sum of the pillow depth and pillow thickness of that specific zone. The basis weight (gsm) and pillow thickness of a specific zone is measured using the Micro-CT Test Method described herein. Pillow depth is measured using a scanning electron microscope (SEM).

"Mean Interply Height" as used herein for a multi-ply fibrous structure is the average of the displacement of the bottom of a first ply and the top of the adjacent ply in the direction perpendicular to the fibrous structure plane. Mean interply can be measured using Micro-CT.

Fibrous Structures

The fibrous structures of the present disclosure can be single-ply or multi-ply fibrous structures and can comprise cellulosic pulp fibers. Other naturally-occurring and/or non-naturally occurring fibers can also be present in the fibrous structures. In one example, the fibrous structures can be through dried in a TAD process, thus producing what is referred to as "TAD paper". The fibrous structures can be wet-laid fibrous structures and can be incorporated into single- or multi-ply sanitary tissue products.

The fibrous structures of the present invention may be creped. During a creping process, one or more knuckles are affixed to a surface, such as a cylindrical dryer, for example a Yankee, and the one or more knuckles are creped off the surface resulting in the knuckles exhibiting the knuckle properties, for example Knuckle Roughness Ra, Knuckle Roughness Rq, and/or Knuckle Creping Frequency, of the present invention.

In one example, the fibrous structure of the present invention include a plurality of semi-continuous knuckles extending from portions of the surface of the fibrous structure in a parallel path, wherein the plurality of semi-continuous knuckles are separated by adjacent semi-continuous pillow regions. Each semi-continuous knuckle comprises a plurality of discrete pillows, the plurality of discrete pillows are arranged in a spaced configuration along the path of each of the semi-continuous knuckle.

The fibrous structures of the invention will be described in the context of bath tissue, and in the context of a papermaking belt comprising cured resin on a woven reinforcing member. However, the invention is not limited to bath tissues and can be utilized in other known processes that impart the knuckles and pillow patterns describe herein, including, for example, the fabric crepe and belt crepe processes described above, modified as described herein to produce the papermaking belts and paper of the invention.

In general, a fibrous structure, e.g., bath tissue, of the invention can be made in a process utilizing a papermaking belt of the type described herein. In a method as described in the aforementioned U.S. Pat. No. 4,514,345, UV-curable resin is cured onto a reinforcing member of woven filaments in a pattern dictated by a patterned mask having opaque regions and transparent regions. The transparent regions permit curing radiation to penetrate to cure the resin to form knuckles, while the opaque regions prevent the curing radiation from curing portions of the resin. Once curing is achieved, the uncured resin is washed away to leave a pattern of cured resin that is substantially identical to the mask pattern. The cured portions are the knuckles of the belt, and the uncured portions are the pillows of the papermaking belt. The pattern of knuckles and pillows can be designed as desired, and the present invention is an improvement in which the pattern of knuckles and pillows disclosed herein delivers a unique papermaking belt that in turn produces sanitary tissue products having superior technical properties compared to prior art sanitary tissue products.

Thus, the mask pattern is replicated in the papermaking belt, which pattern is essentially replicated in the fibrous structure which can be molded onto the papermaking belt when making a fibrous structure. Therefore, in describing the pattern of knuckles and pillows in the fibrous structure of the invention, the pattern of the mask can serve as a proxy, and in the description below a visual description of the mask may be provided, and one is to understand that the dimensions and appearance of the mask is essentially identical to the dimensions and appearance of the papermaking belt made by the mask, and the fibrous structure made on the papermaking belt. Further, in processes that use a papermaking belt not made from a mask, the appearance and structure of the papermaking belt in the same way is imparted to the paper, such that the dimensions of features on the papermaking belt can also be measured and characterized as a proxy for the dimensions and characteristics of the finished paper.

In an effort to improve the product performance properties of, for example, current CHARMIN® bath tissue, the inventors designed a new pattern for the distribution of knuckles and pillows that provides for relatively higher substrate volume that holds up under pressure. It is believed that the increased substrate volume under pressure contributes to better cleaning when used to wipe skin surfaces.

Figure 2:
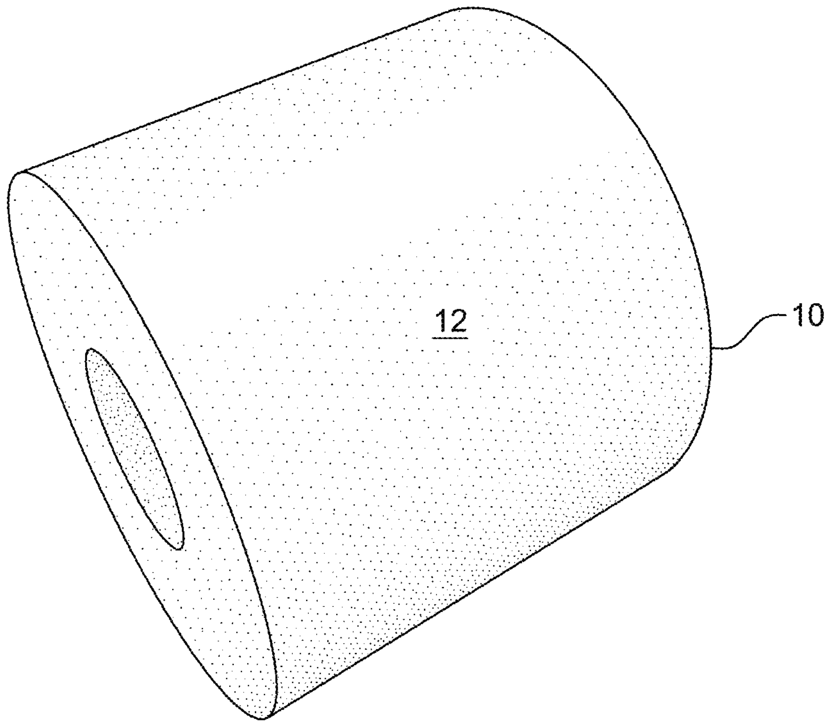
FIG. 2 is a perspective view photograph of a roll of sanitary tissue product of and made by the present invention.
Figure 3:
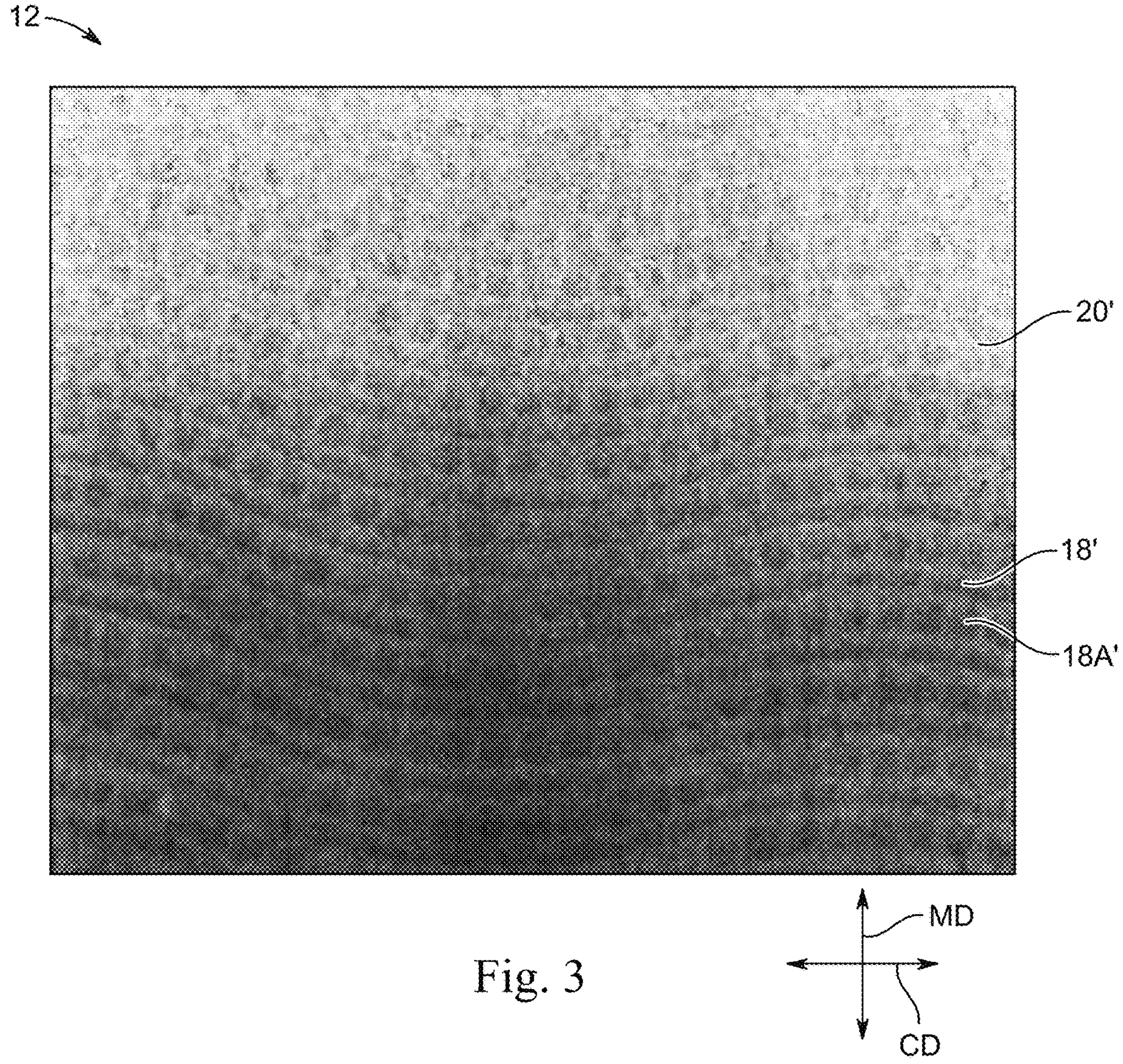
FIG. 3 is a magnified plan view of a portion of the sanitary tissue shown in FIG. 2.

FIG. 2 illustrates a roll 10 of sanitary tissue 12 as an example of the invention. FIG. 3 is a magnified view of the sanitary tissue 12 showing semi-continuous knuckles 20' and semi-continuous pillows 18', as well as discrete pillows 18A'.

Figure 4:
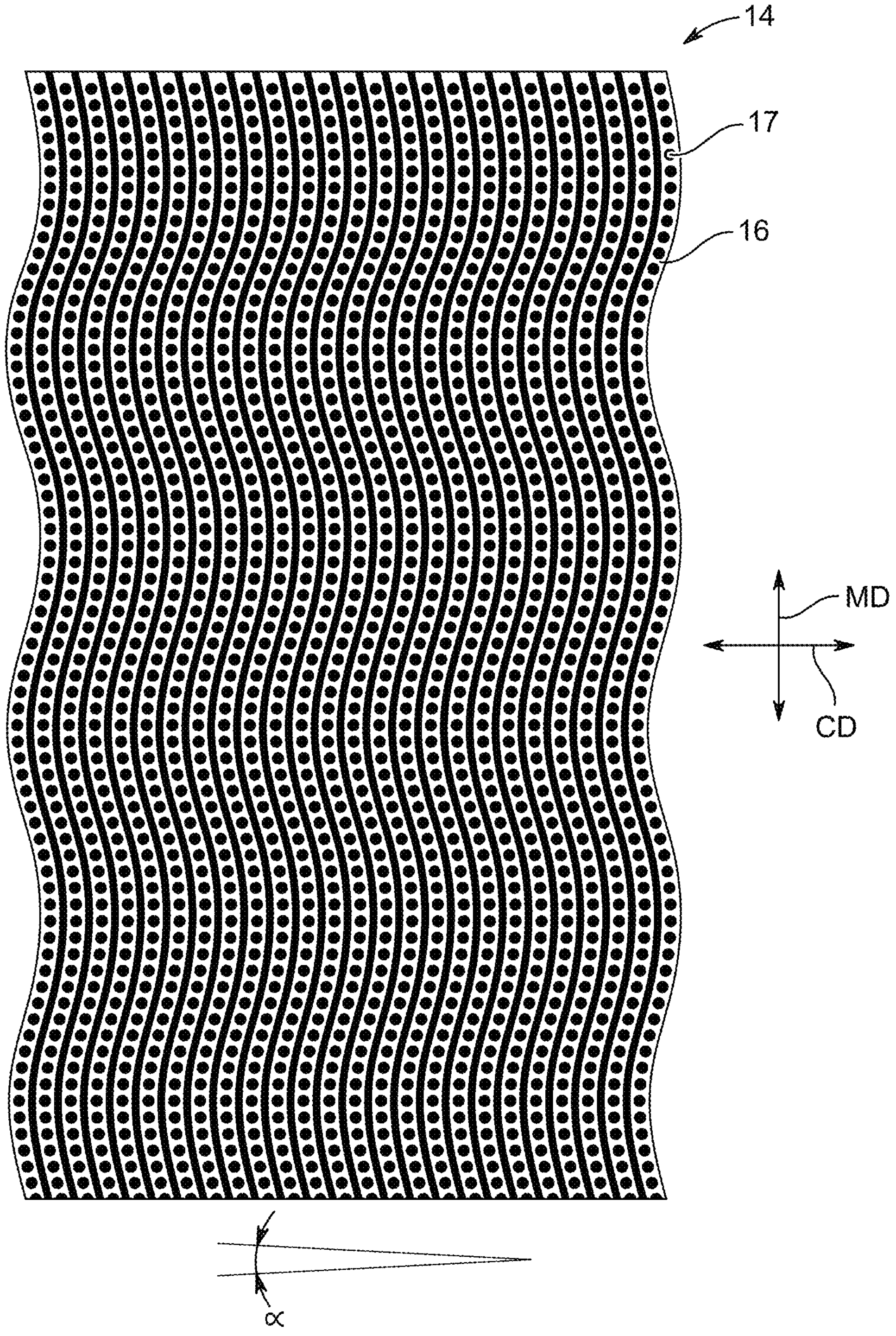
FIG. 4 is a portion of a pattern for a mask used to make a papermaking belt that produced a fibrous structure of the present invention.
Figure 5:
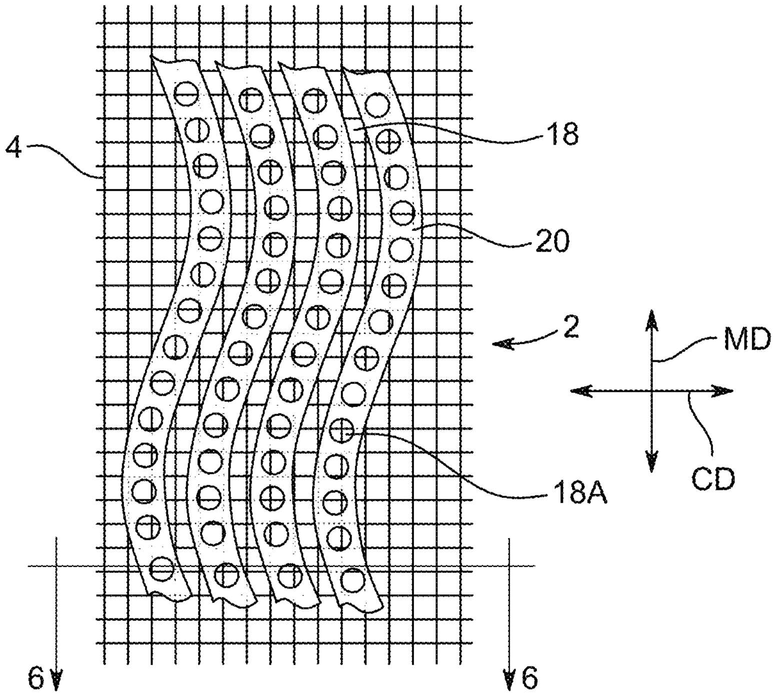
FIG. 5 is a plan view of a portion of a papermaking belt of the present invention that produces a fibrous structure of the present invention.

FIG. 4 shows a portion of the mask 14 used to make the papermaking belt, a portion of which is shown in FIG. 5 (papermaking belt) that made a sanitary tissue 12 like that shown in FIGS. 2 and 3. As shown in FIG. 3, the sanitary tissue 12 exhibits a pattern of semi-continuous knuckles 20' which were formed by semi-continuous cured knuckles 20 on the papermaking belt 2 shown in FIG. 5, and which correspond to the white areas 16 of the mask 14 shown in FIG. 4. Any portion of the pattern of FIG. 4 that is white represents a transparent region of the mask 14, which permits UV-light curing of UV-curable resin to form a knuckle 20 on the papermaking belt shown in FIG. 5. Likewise, each knuckle 20 on the papermaking belt 2 forms a knuckle 20' in sanitary tissue 12 shown in FIG. 3, which can be a relatively high density region or a region of different basis weight relative to the pillow regions. Any portion of the pattern of FIG. 4 that is black 17 represents an opaque region of the mask, which blocks UV-light curing of the UV-curable resin. The uncured resin is ultimately washed away to form a pillow region 18 and 18A on the papermaking belt 2 shown in FIG. 5, which can form a relatively low density pillow 18' and 18A" in the fibrous structure shown in FIG. 3. In the papermaking belt of one example of the invention, both semi-continuous pillows 18 and discrete pillows 18A are formed in the belt 2 (e.g., FIG. 5), and, consequently, as semi-continuous pillows 18' and discrete pillows 18A' in the sanitary tissue paper 12 made thereon (e.g., FIG. 3).

In embodiments of fibrous structures made by belts formed by masks that dictate the eventual relative densities of the discrete elements and continuous elements of fibrous structures, such as the one shown in FIG. 3, the relative densities can be inverted such that the fibrous structure has relatively low density areas where relatively high density areas are and, similarly, relatively high density areas where relatively low density areas are. As can be understood by the description herein, the inverse relationship can be achieved by inverting the black and white (or, more generally, the opaque and transparent) portions of the mask used to make the belt that is used to make the fibrous structure. This inverse relation (black/white) can apply to all patterns of the present disclosure, although all fibrous structures/patterns of each category are not illustrated for brevity since the concept is illustrated in FIGS. 3-13. The papermaking belts of the present disclosure and the process of making them are described in further detail below.

Figure 7:
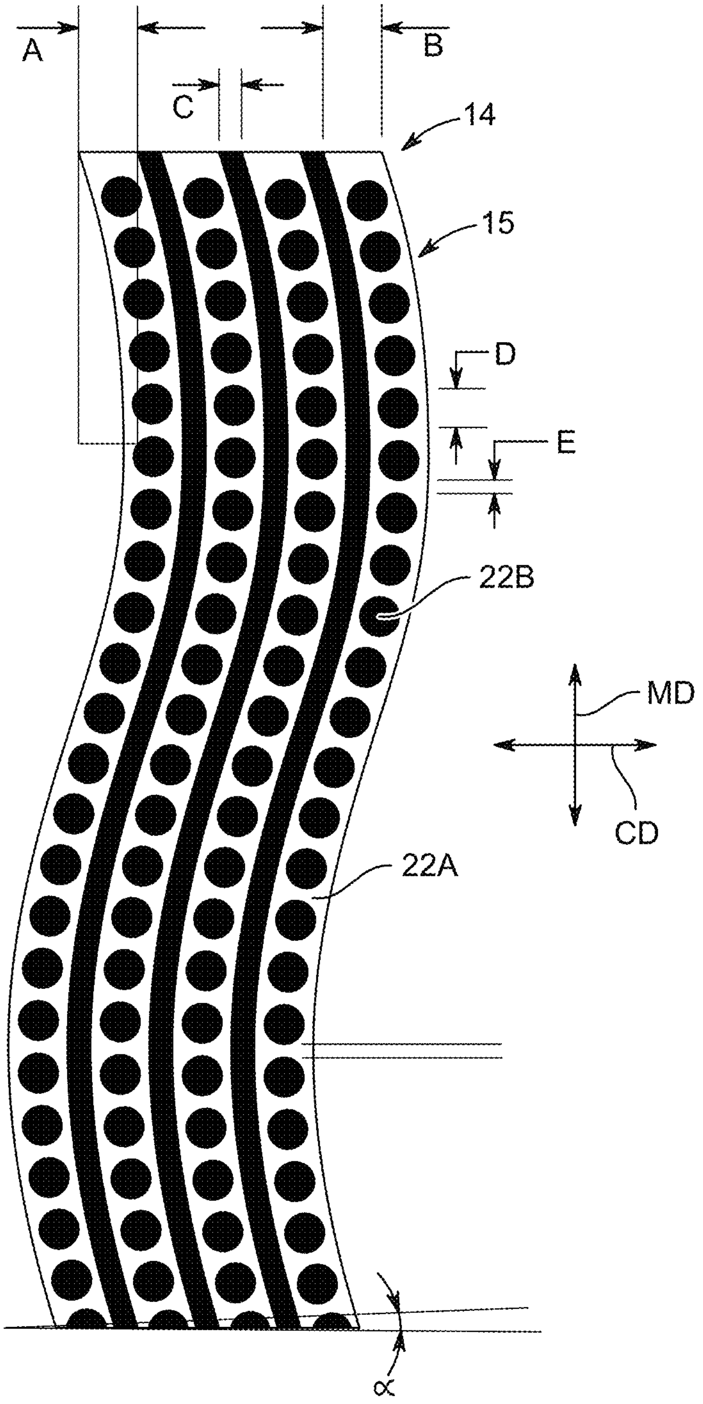
FIG. 7 shows a repeat unit for a pattern for a mask used to make a papermaking belt that produces fibrous structures of the present invention.

FIG. 7 shows a representative repeat unit 15 of a pattern of a mask 14 used to make a papermaking belt having the pattern of knuckles corresponding to a mask that made a sanitary tissue 12 like the one shown in FIGS. 2 and 3. Again, as discussed above, the sanitary tissue 12 exhibits a pattern of knuckles 20' (see, for example, FIG. 3) which were formed by cured resin knuckles 20 on the papermaking belt 2 (see, for example, FIG. 5), and which correspond to the white, i.e., transparent, areas 16 of the mask 14 shown in FIG. 4.

A mask 14 (see, for example, FIGS. 4 and 7-13) as shown can create a papermaking belt 2 (see, for example, FIG. 5), and therefore a sanitary tissue product 12 (see, for example, FIGS. 2 and 3), having a plurality of semi-continuous curvilinear knuckles 20' separated by adjacent semi-continuous curvilinear pillows 18' in a generally parallel configuration with the width and spacing of the knuckles 20' and pillows 18' being as determined for desired properties of a sanitary tissue product 12. In addition to the semi-continuous pillows 18', an example of the present invention also includes discrete pillows 18A' formed within the semi-continuous knuckles 20'. Discrete pillows 18A' can be any shape desired and as more fully shown below, but in an example can be circular and spaced in a uniform manner along the length of a given knuckle 20'.

The dimensions of a mask 14, and therefore the resulting papermaking belt 2 can range according to desired characteristics of the desired paper 12 properties. Using mask 14 as described in FIG. 7 for non-limiting description, the curvilinear aspect can be described as a wave-form having an amplitude A of from about 1.778 mm to about 4.826 mm and can be about 2.286 mm. The width B of semi-continuous knuckles can be uniform and can be from about 1.778 mm to about 2.794 mm and can be about 2.515 mm. The width C of semi-continuous pillows can be uniform and can be from about 0.762 mm to about 2.032 mm and can be about 1.016 mm. The diameter D of discrete pillows, if generally circular shaped, can be from about 0.254 mm to about 3.81 mm and/or from about 0.508 mm to about 3.048 mm and/or from about 0.762 mm to about 2.54 mm and/or from about 1.27 mm to about 2.286 mm and can be about 1.791 mm. The spacing E between discrete pillows can be uniform and can be from about 0.254 mm to about 1.016 mm and can be about 0.4648 mm. The entire pattern can be rotated an angle off of the Machine Direction, MD, by an angle $\alpha$ which can be about 2-5 degrees, and can be about 3 degrees.

Figure 8:
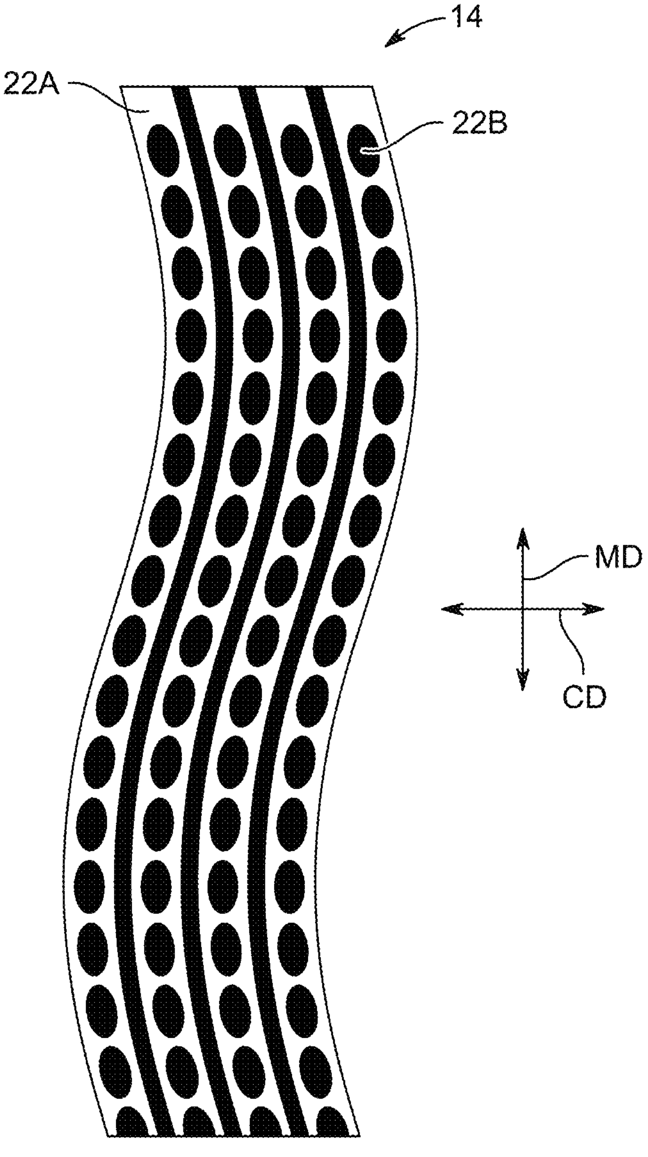
FIG. 8 is a plan view of a portion of a mask showing an alternate pattern for making a papermaking belt of the present invention that produces a fibrous structure of the present invention.

Discrete pillows 18A' (see, for example, FIG. 3) can have various shapes, including any shape of a two-dimensional closed figure, with non-limiting examples shown in FIGS. 8-13. In FIG. 8 a portion 22B of a mask 14 is shown for making oval or elliptical discrete pillows that can have a long dimension being between about 1.27 mm and about 2.54 mm and can be about 2.286 mm, and a short dimension of between about 0.889 mm and about 1.651 mm and can be about 1.397 mm. The spacing between elliptical discrete pillows can be from about 0.508 mm and about 1.016 mm and can be about 0.762 mm.

Figure 9:
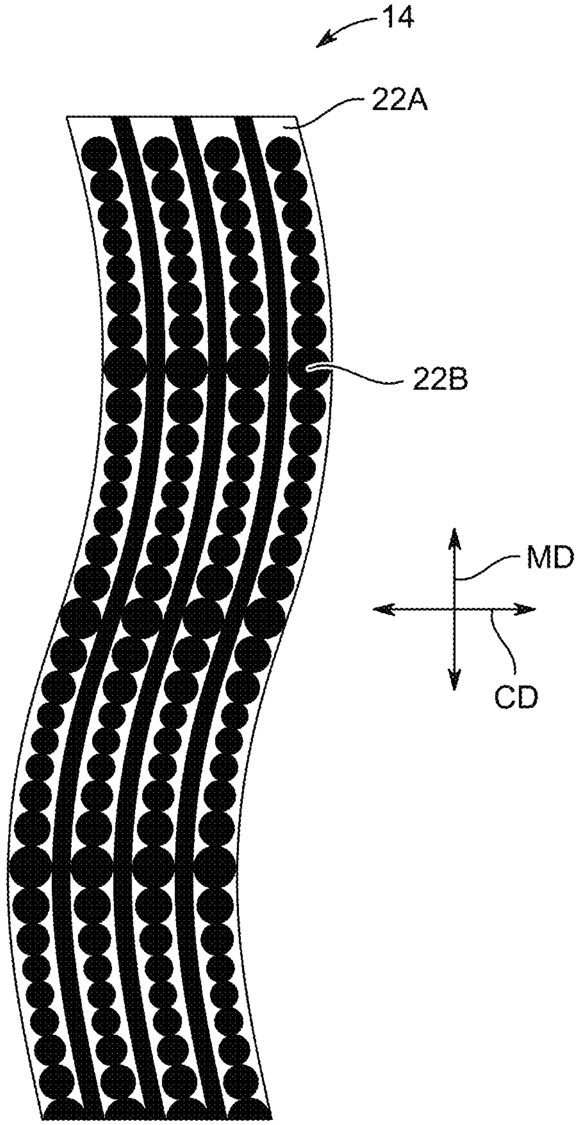
FIG. 9 is a plan view of a portion of a mask showing an alternate pattern for making of a papermaking belt of the present invention that produces a fibrous structure of the present invention.

FIG. 9 shows a portion 22B of a mask 14 for making discrete pillows that are variable in size, in the illustrated case, diameter of a circular shape. In the illustrated example, five different diameter pillows vary in diameter from about 0.762 mm to about 1.778 mm and are generally regularly spaced along semi-continuous knuckle 20.

Figure 10:
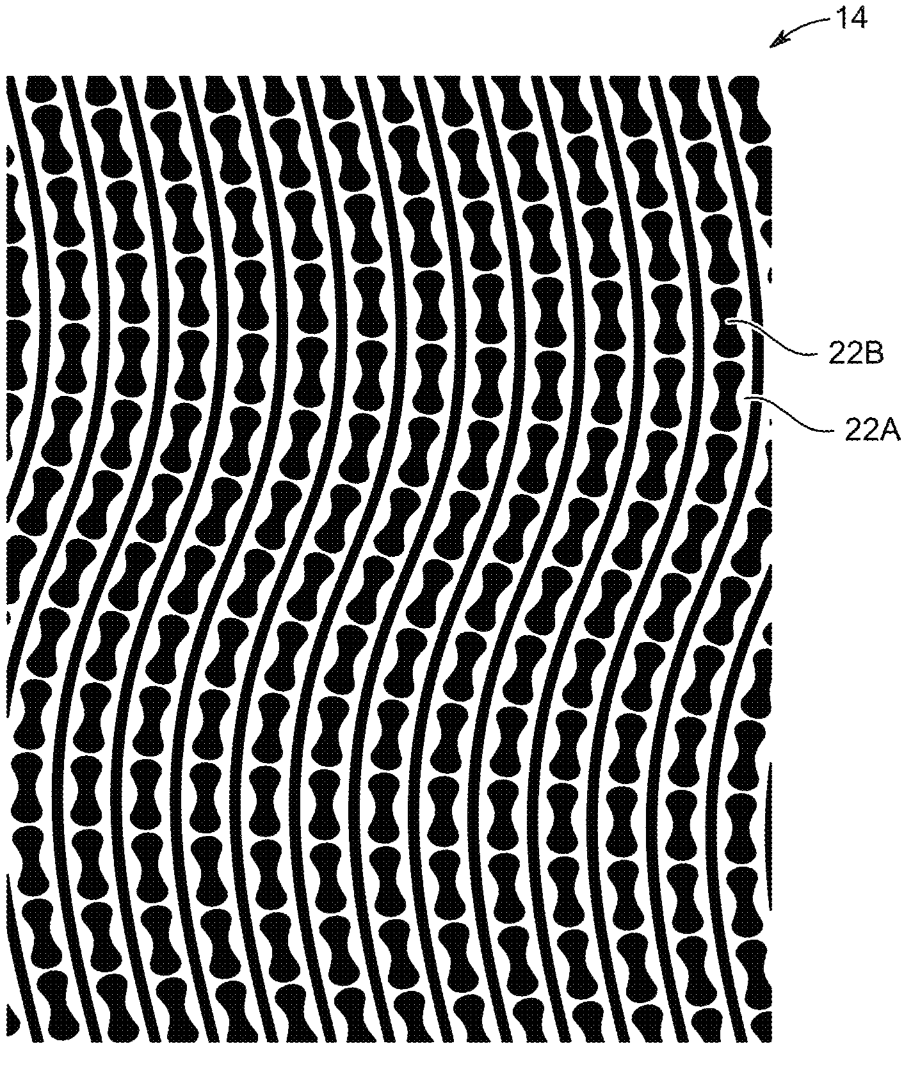
FIG. 10 is a plan view of a portion of a mask showing an alternate pattern for making of a papermaking belt of the present invention that produces a fibrous structure of the present invention.

FIG. 10 shows an example of a portion 22B of a mask 14 for making discrete pillows that are in the shape of a dogbone. The dogbone shaped discrete pillows are a non-limiting example of a relatively complex shape that discrete pillows 22B can take.

Figure 11:
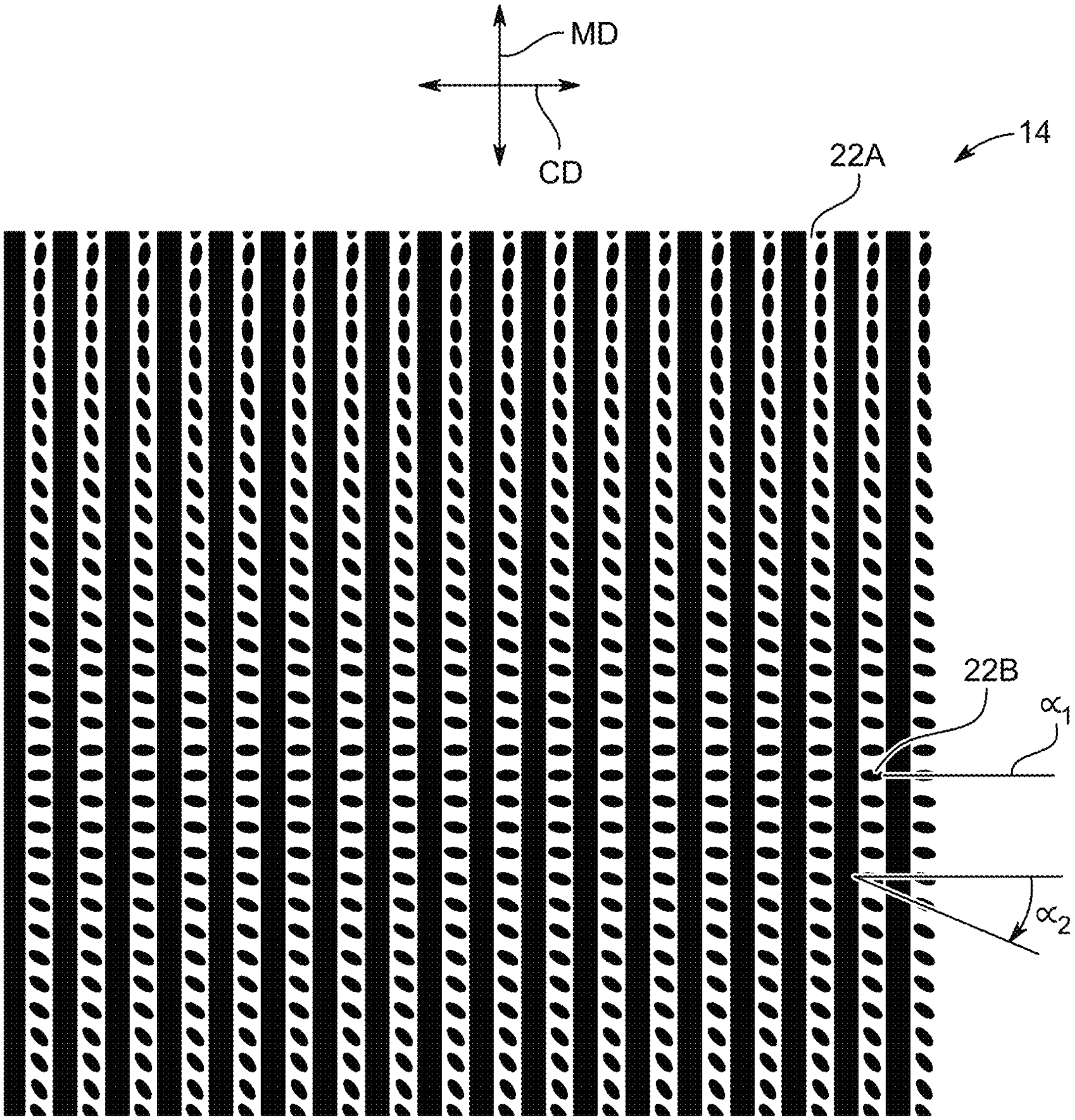
FIG. 11 is a plan view of a portion of a mask showing an alternate pattern for making of a papermaking belt of the present invention that produces a fibrous structure of the present invention.

FIG. 11 shows an example of a mask 14 in which a portion 22A (white surrounding the black portion 22B) for making semi-continuous knuckles that are generally straight and parallel, and in which the portions 22B for making discrete pillows are in the shape of ellipses, and, as well, the major axis of each ellipse is rotated in the off a CD-direction in a varying amount as the series of ellipses progress in the MD, as illustrated by $\alpha$1 and $\alpha$2 in FIG. 11. In the illustrated embodiment, the rotation from one ellipse to the next is 5 degrees. It is believed that such rotation of discrete pillows contributes to improved visual appearance of a fibrous structure made thereon.

Figure 12:
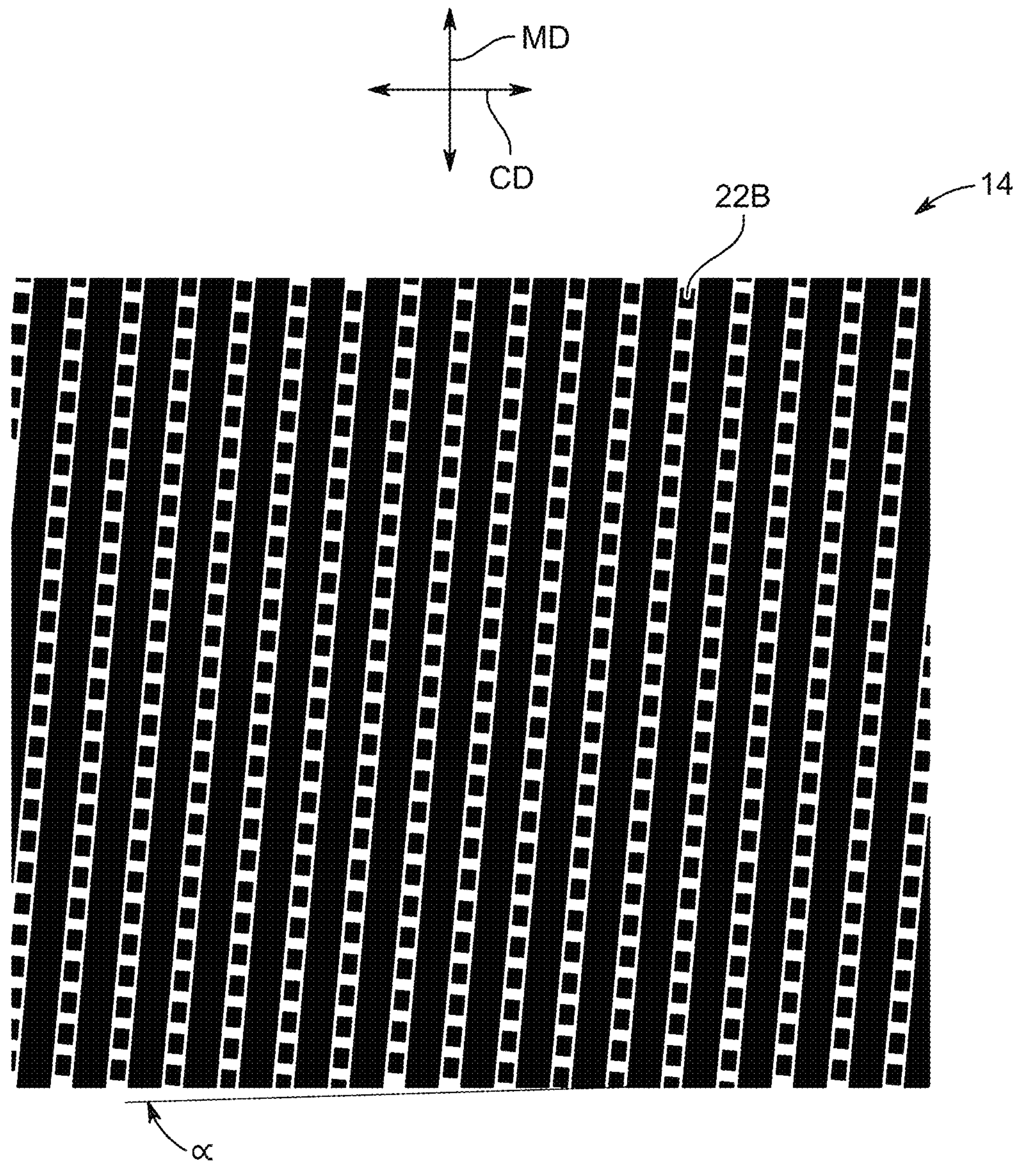
FIG. 12 is a plan view of a portion of a mask showing an alternate pattern for making of a papermaking belt of the present invention that produces a fibrous structure of the present invention.

FIG. 12 shows an example of a mask 14 in which the portions 22B for making discrete pillows are in the shape of rectangles, and, as well, the pattern is oriented at an angle $\alpha$ off of the MD-CD orientation.

In general, the papermaking belt made according to the mask disclosed herein can have a knuckle area of between about 20-50% and can be about 39%.

In one example, the creped fibrous structure of the present invention may exhibit a Knuckle Roughness Ra of less than 9.00 and/or less than 8.00 and/or less than 7.00 and/or less than 6.00 and/or less than 5.00 μm as measured according to the MikroCAD Test Method.

In one example, the creped fibrous structure of the present invention may exhibit, in addition to the Knuckle Roughness Ra values above or alone, a Knuckle Roughness Rq of less than 11.00 and/or less than 10.00 and/or less than 9.00 and/or less than 8.00 and/or less than 7.00 μm and/or less than 6.50 μm as measured according to the MikroCAD Test Method.

In one example, the creped fibrous structure of the present invention may exhibit, in addition to one or both of the Knuckle Roughness values Ra and Rq above or alone, a Knuckle Creping Frequency of less than 5.50 and/or less than 5.25 and/or less than 5.00 and/or less than 4.75 and/or less than 4.55 #/mm as measured according to the MikroCAD Test Method.

In one example, the fibrous structure, for example a bath tissue (for example a fibrous structure that comprises a temporary wet strength agent and/or is void of permanent wet strength and/or is designed to be flushed down toilets), for example a multi-ply bath tissue, such as a multi-ply bath tissue roll, and/or is a creped fibrous structure, of the present invention comprising a first pillow exhibiting a first height and a second pillow exhibiting a second height wherein the first height is at least 50% and/or at least 60% and/or at least 65% and/or at least 70% and/or at least 75% greater than the second height.

In one example, the fibrous structure, for example a bath tissue (for example a fibrous structure that comprises a temporary wet strength agent and/or is void of permanent wet strength and/or is designed to be flushed down toilets), for example a multi-ply bath tissue, such as a multi-ply bath tissue roll, and/or is a creped fibrous structure, of the present invention may comprise a first pillow that exhibits a bulk building capability of greater than 16 and/or greater than 17 and/or greater than 18 and/or greater than 19 and/or greater than 20 cc/g.

In another example, the fibrous structure, for example a bath tissue (for example a fibrous structure that comprises a temporary wet strength agent and/or is void of permanent wet strength and/or is designed to be flushed down toilets), for example a multi-ply bath tissue, such as a multi-ply bath tissue roll, and/or is a creped fibrous structure, of the present invention may comprise a first pillow that exhibits a bulk building capability of at least 20% and/or at least 25% and/or at least 30% of the bulk building capability of a second pillow within the fibrous structure.

In yet another example, the fibrous structure, for example a bath tissue (for example a fibrous structure that comprises a temporary wet strength agent and/or is void of permanent wet strength and/or is designed to be flushed down toilets), for example a multi-ply bath tissue, such as a multi-ply bath tissue roll, and/or is a creped fibrous structure, of the present invention may exhibit a wet caliper normalized for basis weight of greater than 0.65 and/or greater than 0.68 and/or greater than 0.70 and/or greater than 0.72 and/or greater than 0.74 and/or greater than 0.77 mils/(lb./3000 $ft^2$) as measured according to the Caliper Test Method.

In even another example, a multi-ply fibrous structure, for example a bath tissue (for example a fibrous structure that comprises a temporary wet strength agent and/or is void of permanent wet strength and/or is designed to be flushed down toilets), for example a multi-ply bath tissue, such as a multi-ply bath tissue roll, and/or is a creped fibrous structure, comprising at least one fibrous structure, for example a bath tissue (for example a fibrous structure that comprises a temporary wet strength agent and/or is void of permanent wet strength and/or is designed to be flushed down toilets), and/or is a creped fibrous structure, according to the present invention exhibits a mean interply height of greater than 0.150 and/or greater than 0.175 and/or greater than 0.190 and/or greater than 0.200 and/or greater than 0.210 mm.

In one example, the fibrous structure, for example sanitary tissue product, may be in the form of a roll. When in the form of a roll, the roll may exhibit a roll compressibility of about 0.5% to about 15%, or about 1.0% to about 12.5% or about 1.0% to about 8%, specifically including all 0.1 increments between the recited ranges as measured according to the Roll Compressibility Test Method described herein. The roll of fibrous structure, for example sanitary tissue product, of the present disclosure may exhibit a roll compressibility of less than about 15% and/or less than about 12.5% and/or less than about 10% and/or less than about 8% and/or less than about 7% and/or less than about 6% and/or less than about 5% and/or less than about 4% and/or less than about 3% to about 0 and/or to about 0.5%, and/or to about 1%, specifically including all 0.1 increments between the recited ranges as measured according to the Roll Compressibility Test Method. The roll of fibrous structure, for example sanitary tissue product, of the present invention may exhibit a roll compressibility of from about 4% to about 10% and/or from about 4% to about 8% and/or from about 4% to about 7% and/or from about 4% to about 6%, specifically including all 0.1 increments between the recited ranges as measured according to the Roll Compressibility Test Method.

When the fibrous structure, for example sanitary tissue product, is in the form of a roll, the roll exhibit a roll bulk of about 4 $cm^3/g$ to about 30 $cm^3/g$ and/or about 6 $cm^3/g$ to about 15 $cm^3/g$, specifically including all 0.1 increments between the recited ranges. The roll of fibrous structure, for example sanitary tissue product, of the present invention may exhibit a roll bulk of greater than about 4 $cm^3/g$ and/or greater than about 5 $cm^3/g$ and/or greater than about 6 $cm^3/g$ and/or greater than about 7 $cm^3/g$ and/or greater than about 8 $cm^3/g$ and/or greater than about 9 $cm^3/g$ and/or greater than about 10 $cm^3/g$ and/or greater than about 12 $cm^3/g$ and/or less than about 20 $cm^3/g$ and/or less than about 18 $cm^3/g$ and/or less than about 16 $cm^3/g$ and/or less than about 14 $cm^3/g$, specifically including all 0.1 increments between the recited ranges.

In one example, a roll of fibrous structure, for example sanitary tissue product, of the present invention may exhibit a roll bulk of greater than 4 $cm^3/g$ and a Roll Compressibility of less than 10% and/or a roll bulk of greater than 6 $cm^3/g$ and a Roll Compressibility of less than 8% and/or a roll bulk of greater than 8 $cm^3/g$ and a Roll Compressibility of less than 7% as measured according to the Roll Compressibility Test Method.

The fibrous structure, for example sanitary tissue product, of the present invention may exhibit a roll firmness of about 2.5 mm to about 15 mm and/or about 3 mm to about 13 mm and/or about 4 mm to about 10 mm, specifically including all 0.1 increments between the recited ranges as measured according to the Roll Firmness Test Method described herein.

In one example, the fibrous structure, for example sanitary tissue product, may be in the form of a roll. When in the form of a roll, the roll may exhibit a roll compressibility of about 0.5% to about 15%, or about 1.0% to about 12.5% or about 1.0% to about 8%, specifically including all 0.1 increments between the recited ranges as measured according to the Roll Compressibility Test Method described herein and a roll bulk of about 4 $cm^3/g$ to about 30 $cm^3/g$ and/or about 6 $cm^3/g$ to about 15 $cm^3/g$, specifically including all 0.1 increments between the recited ranges and a roll firmness of about 2.5 mm to about 15 mm and/or about 3 mm to about 13 mm and/or about 4 mm to about 10 mm, specifically including all 0.1 increments between the recited ranges as measured according to the Roll Firmness Test Method described herein.

In one example, a roll of fibrous structure, for example sanitary tissue product, of the present inventions may exhibit a roll diameter of about 3 inches to about 12 inches and/or about 3.5 inches to about 8 inches and/or about 4.5 inches to about 6.5 inches, specifically including all 0.1 increments between the recited ranges. The roll of fibrous structure, for example sanitary tissue product, of the present invention may exhibit a roll diameter of greater than 4 inches and/or greater than 5 inches and/or greater than 6 inches and/or greater than 7 inches and/or greater than 8 inches, specifically including all 0.1 increments between the recited ranges.

In one example, the fibrous structure, for example sanitary tissue product, of the present invention exhibits a Dry Recoverability of greater than 1.00 and/or greater than 1.25 and/or greater than 1.50 and/or greater than 1.75 and/or greater than 2.00 and/or greater than 2.25 and/or greater than 2.40 and/or greater than 2.75 as measured according to Dry Compressive Modulus Test Method.

In one example, the fibrous structure, for example sanitary tissue product, of the present invention exhibits a Dry Compressibility of greater than 1.00 and/or greater than 1.25 and/or greater than 1.50 and/or greater than 1.75 and/or greater than 2.00 and/or greater than 2.25 and/or greater than 2.40 and/or greater than 2.60 as measured according to Dry Compressive Modulus Test Method.

In one example, the fibrous structure, for example sanitary tissue product, of the present invention exhibits a Dry Thick Compression of greater than 150 and/or greater than 175 and/or greater than 200 and/or greater than 225 and/or greater than 250 and/or greater than 275 and/or greater than 300 and/or greater than 310 as measured according to Dry Compressive Modulus Test Method.

In one example, the fibrous structure, for example sanitary tissue product, of the present invention exhibits a Dry Thick Compressive Recovery of greater than 150 and/or greater than 175 and/or greater than 190 and/or greater than 200 and/or greater than 210 and/or greater than 225 and/or greater than 240 as measured according to Dry Compressive Modulus Test Method.

In one example, the fibrous structure, for example sanitary tissue product, of the present invention exhibits a Dry Recoverability of greater than 1.00 and/or greater than 1.25 and/or greater than 1.50 and/or greater than 1.75 and/or greater than 2.00 and/or greater than 2.25 and/or greater than 2.40 and/or greater than 2.75 as measured according to Dry Compressive Modulus Test Method and a Dry Compressibility of greater than 1.00 and/or greater than 1.25 and/or greater than 1.50 and/or greater than 1.75 and/or greater than 2.00 and/or greater than 2.25 and/or greater than 2.40 and/or greater than 2.60 as measured according to Dry Compressive Modulus Test Method and a Dry Thick Compression of greater than 150 and/or greater than 175 and/or greater than 200 and/or greater than 225 and/or greater than 250 and/or greater than 275 and/or greater than 300 and/or greater than 310 as measured according to Dry Compressive Modulus Test Method and a Dry Thick Compressive Recovery of greater than 150 and/or greater than 175 and/or greater than 190 and/or greater than 200 and/or greater than 210 and/or greater than 225 and/or greater than 240 as measured according to Dry Compressive Modulus Test Method.

Additionally, the resultant article exhibits compressibility and recovery when wet, due to the wet formed nature of the pillows and/or knuckles of the fibrous structure.

Papermaking Belts

The fibrous structures of the present disclosure can be made using a papermaking belt having knuckles in the shape and pattern described herein. The papermaking belt can be thought of as a molding member. A "molding member" is a structural element having cell sizes and placement as described herein that can be used as a support for an embryonic web comprising a plurality of cellulosic fibers and/or a plurality of synthetic fibers as well as to "mold" a desired geometry of the fibrous structures during papermaking (i.e., excluding "dry" processes such as embossing). The molding member can comprise fluid-permeable areas and has the ability to impart a three-dimensional pattern of knuckles to the fibrous structure being produced thereon, and includes, without limitation, single-layer and multi-layer structures in the class of papermaking belts having UV-cured resin knuckles on a woven reinforcing member as disclosed in the above mentioned U.S. Pat. No. 6,610,173, issued to Lindsay et al. or U.S. Pat. No. 4,514,345 issued to Trokhan.

Figure 1B:
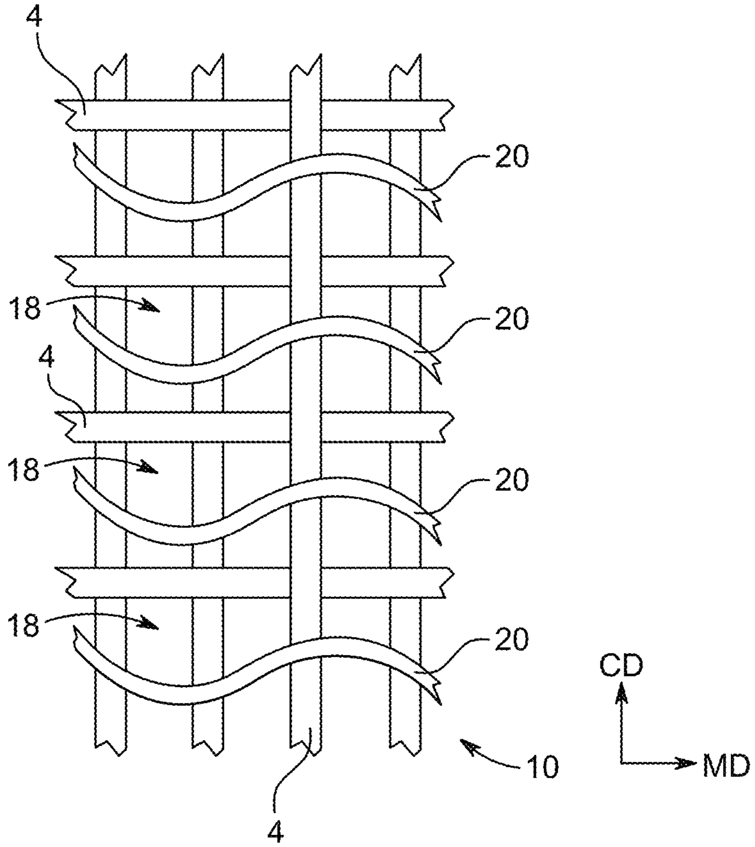
Fig. 1B PRIOR ART
FIG. 1B is an enlarged portion of the Prior Art molding member of FIG. 1A.

In one embodiment, the papermaking belt is a fabric crepe belt for use in a process as disclosed in the above mentioned U.S. Pat. No. 7,494,563, issued to Edwards, but having the pattern of cells, i.e., knuckles, as disclosed herein. Fabric crepe belts can be made by extruding, coating, or otherwise applying a polymer, resin, or other curable material onto a support member, such that the resulting pattern of three-dimensional features are belt knuckles with the pillow regions serving as large recessed pockets the fiber upon high impact creping in a creping nip between a backing roll and the fabric to form additional bulk in conventional wet press processes. In another embodiment, the papermaking belt can be a continuous knuckle belt of the type exemplified in FIG. 1 of U.S. Pat. No. 4,514,345 issued to Trokhan, having deflection conduits that serve as the recessed pockets of the belt shown and described in U.S. Pat. No. 7,494,563, for example in place of the fabric crepe belt shown and described therein.

In an example of a method for making fibrous structures of the present disclosure, the method can comprise the steps of:

(a) providing a fibrous furnish comprising fibers; and
(b) depositing the fibrous furnish onto a molding member such that at least one fiber is deflected out-of-plane of the other fibers present on the molding member.

In still another example of a method for making a fibrous structure of the present disclosure, the method comprises the steps of:

(a) providing a fibrous furnish comprising fibers;
(b) depositing the fibrous furnish onto a foraminous member to form an embryonic fibrous web;
(c) associating the embryonic fibrous web with a papermaking belt having a pattern of knuckles as disclosed herein such that at a portion of the fibers are deflected out-of-plane of the other fibers present in the embryonic fibrous web; and
(d) drying said embryonic fibrous web such that that the dried fibrous structure is formed.

In another example of a method for making the fibrous structures of the present disclosure, the method can comprise the steps of:

(a) providing a fibrous furnish comprising fibers;
(b) depositing the fibrous furnish onto a foraminous member such that an embryonic fibrous web is formed;
(c) associating the embryonic web with a papermaking belt having a pattern of knuckles as disclosed herein such that at a portion of the fibers can be formed in the substantially continuous deflection conduits;
(d) deflecting a portion of the fibers in the embryonic fibrous web into the substantially continuous deflection conduits and removing water from the embryonic web so as to form an intermediate fibrous web under such conditions that the deflection of fibers is initiated no later than the time at which the water removal through the discrete deflection cells or the substantially continuous deflection conduits is initiated; and
(e) optionally, drying the intermediate fibrous web; and
(f) optionally, foreshortening the intermediate fibrous web, such as by creping.

Figure 14:
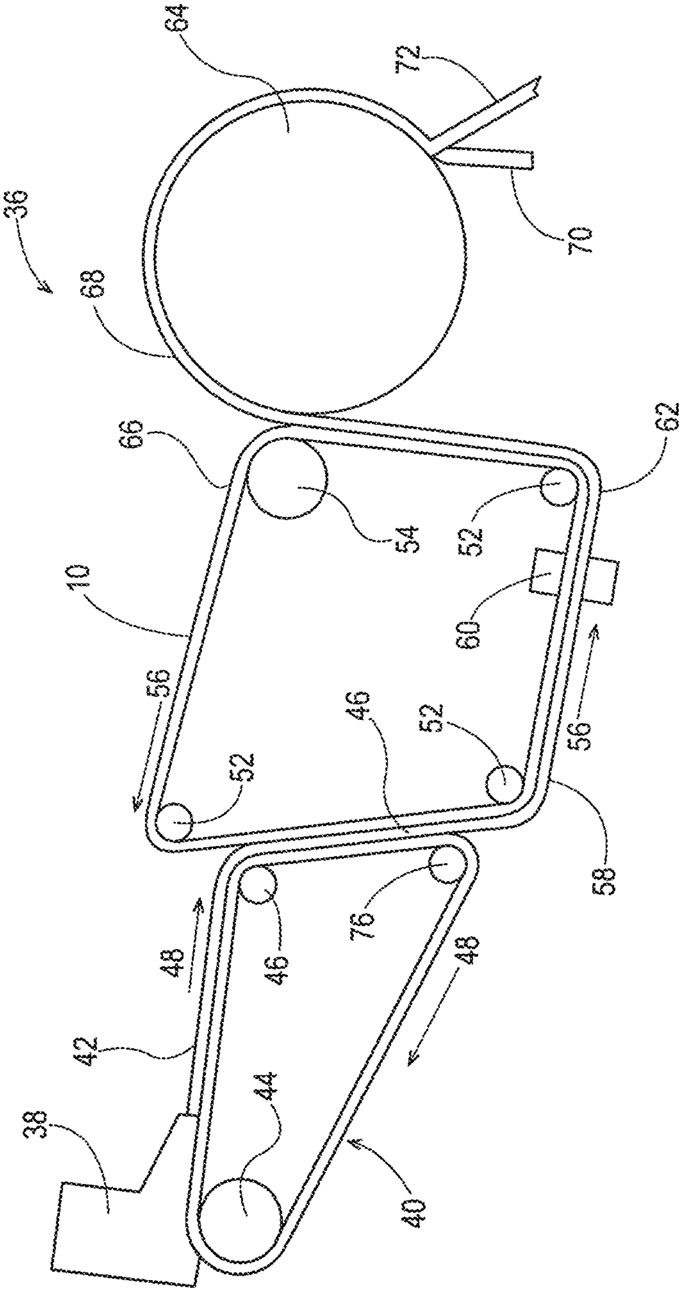
FIG. 14 is a schematic representation of an example of a through-air-drying papermaking process for making a sanitary tissue product according to the present invention.

As shown in FIG. 14, one example of a process and equipment, represented as 36 for making a sanitary tissue product according to the present invention comprises supplying an aqueous dispersion of fibers (a fibrous furnish or fiber slurry) to a headbox 38 which can be of any convenient design. From headbox 38 the aqueous dispersion of fibers is delivered to a first foraminous member 40 which is typically a Fourdrinier wire, to produce an embryonic fibrous structure 42.

The first foraminous member 40 may be supported by a breast roll 44 and a plurality of return rolls 46 of which only two are shown. The first foraminous member 40 can be propelled in the direction indicated by directional arrow 48 by a drive means, not shown. Optional auxiliary units and/or devices commonly associated fibrous structure making machines and with the first foraminous member 40, but not shown, include forming boards, hydrofoils, vacuum boxes, tension rolls, support rolls, wire cleaning showers, and the like.

After the aqueous dispersion of fibers is deposited onto the first foraminous member 40, embryonic fibrous structure 42 is formed, typically by the removal of a portion of the aqueous dispersing medium by techniques well known to those skilled in the art. Vacuum boxes, forming boards, hydrofoils, and the like are useful in effecting water removal. The embryonic fibrous structure 42 may travel with the first foraminous member 40 about return roll 46 and is brought into contact with a patterned molding member 10 according to the present invention, such as a 3D patterned through-air-drying belt. While in contact with the patterned molding member 10, the embryonic fibrous structure 42 will be deflected, rearranged, and/or further dewatered.

The patterned molding member 10 may be in the form of an endless belt. In this simplified representation, the patterned molding member 10 passes around and about patterned molding member return rolls 52 and impression nip roll 54 and may travel in the direction indicated by directional arrow 56. Associated with patterned molding member 10, but not shown, may be various support rolls, other return rolls, cleaning means, drive means, and the like well known to those skilled in the art that may be commonly used in fibrous structure making machines.

After the embryonic fibrous structure 42 has been associated with the patterned molding member 10, fibers within the embryonic fibrous structure 42 are deflected into pillows and/or pillow network ("deflection conduits") present in the patterned molding member 10. In one example of this process step, there is essentially no water removal from the embryonic fibrous structure 42 through the deflection conduits after the embryonic fibrous structure 42 has been associated with the patterned molding member 10 but prior to the deflecting of the fibers into the deflection conduits. Further water removal from the embryonic fibrous structure 42 can occur during and/or after the time the fibers are being deflected into the deflection conduits. Water removal from the embryonic fibrous structure 42 may continue until the consistency of the embryonic fibrous structure 42 associated with patterned molding member 10 is increased to from about 25% to about 35%. Once this consistency of the embryonic fibrous structure 42 is achieved, then the embryonic fibrous structure 42 can be referred to as an intermediate fibrous structure 58. During the process of forming the embryonic fibrous structure 42, sufficient water may be removed, such as by a noncompressive process, from the embryonic fibrous structure 42 before it becomes associated with the patterned molding member 10 so that the consistency of the embryonic fibrous structure 42 may be from about 10% to about 30%.

While applicants decline to be bound by any particular theory of operation, it appears that the deflection of the fibers in the embryonic fibrous structure and water removal from the embryonic fibrous structure begin essentially simultaneously. Embodiments can, however, be envisioned wherein deflection and water removal are sequential operations. Under the influence of the applied differential fluid pressure, for example, the fibers may be deflected into the deflection conduit with an attendant rearrangement of the fibers. Water removal may occur with a continued rearrangement of fibers. Deflection of the fibers, and of the embryonic fibrous structure, may cause an apparent increase in surface area of the embryonic fibrous structure. Further, the rearrangement of fibers may appear to cause a rearrangement in the spaces or capillaries existing between and/or among fibers.

It is believed that the rearrangement of the fibers can take one of two modes dependent on a number of factors such as, for example, fiber length. The free ends of longer fibers can be merely bent in the space defined by the deflection conduit while the opposite ends are restrained in the region of the ridges. Shorter fibers, on the other hand, can actually be transported from the region of the ridges into the deflection conduit (The fibers in the deflection conduits will also be rearranged relative to one another). Naturally, it is possible for both modes of rearrangement to occur simultaneously.

As noted, water removal occurs both during and after deflection; this water removal may result in a decrease in fiber mobility in the embryonic fibrous structure. This decrease in fiber mobility may tend to fix and/or freeze the fibers in place after they have been deflected and rearranged. Of course, the drying of the fibrous structure in a later step in the process of this invention serves to more firmly fix and/or freeze the fibers in position.

Any convenient means conventionally known in the papermaking art can be used to dry the intermediate fibrous structure 58. Examples of such suitable drying process include subjecting the intermediate fibrous structure 58 to conventional and/or flow-through dryers and/or Yankee dryers.

In one example of a drying process, the intermediate fibrous structure 58 in association with the patterned molding member 10 passes around the patterned molding member return roll 52 and travels in the direction indicated by directional arrow 56. The intermediate fibrous structure 58 may first pass through an optional predryer 60. This predryer 60 can be a conventional flow-through dryer (hot air dryer) well known to those skilled in the art. Optionally, the predryer 60 can be a so-called capillary dewatering apparatus. In such an apparatus, the intermediate fibrous structure 58 passes over a sector of a cylinder having preferential-capillary-size pores through its cylindrical-shaped porous cover. Optionally, the predryer 60 can be a combination capillary dewatering apparatus and flow-through dryer. The quantity of water removed in the predryer 60 may be controlled so that a predried fibrous structure 62 exiting the predryer 60 has a consistency of from about 30% to about 98%. The predried fibrous structure 62, which may still be associated with patterned molding member 10, may pass around another patterned molding member return roll 52 and as it travels to an impression nip roll 54. As the predried fibrous structure 62 passes through the nip formed between impression nip roll 54 and a surface of a Yankee dryer 64, the pattern formed by the top surface 66 of patterned molding member 10 is impressed into the predried fibrous structure 62 to form a 3D patterned fibrous structure 68. The imprinted fibrous structure 68 can then be adhered to the surface of the Yankee dryer 64 where it can be dried to a consistency of at least about 95%.

The 3D patterned fibrous structure 68 can then be foreshortened by creping the 3D patterned fibrous structure 68 with a creping blade 70 to remove the 3D patterned fibrous structure 68 from the surface of the Yankee dryer 64 resulting in the production of a 3D patterned creped fibrous structure 72 in accordance with the present invention. As used herein, foreshortening refers to the reduction in length of a dry (having a consistency of at least about 90% and/or at least about 95%) fibrous structure which occurs when energy is applied to the dry fibrous structure in such a way that the length of the fibrous structure is reduced and the fibers in the fibrous structure are rearranged with an accompanying disruption of fiber-fiber bonds. Foreshortening can be accomplished in any of several well-known ways. One common method of foreshortening is creping. The 3D patterned creped fibrous structure 72 may be subjected to post processing steps such as calendaring, tuft generating operations, and/or embossing and/or converting.

Figure 15:
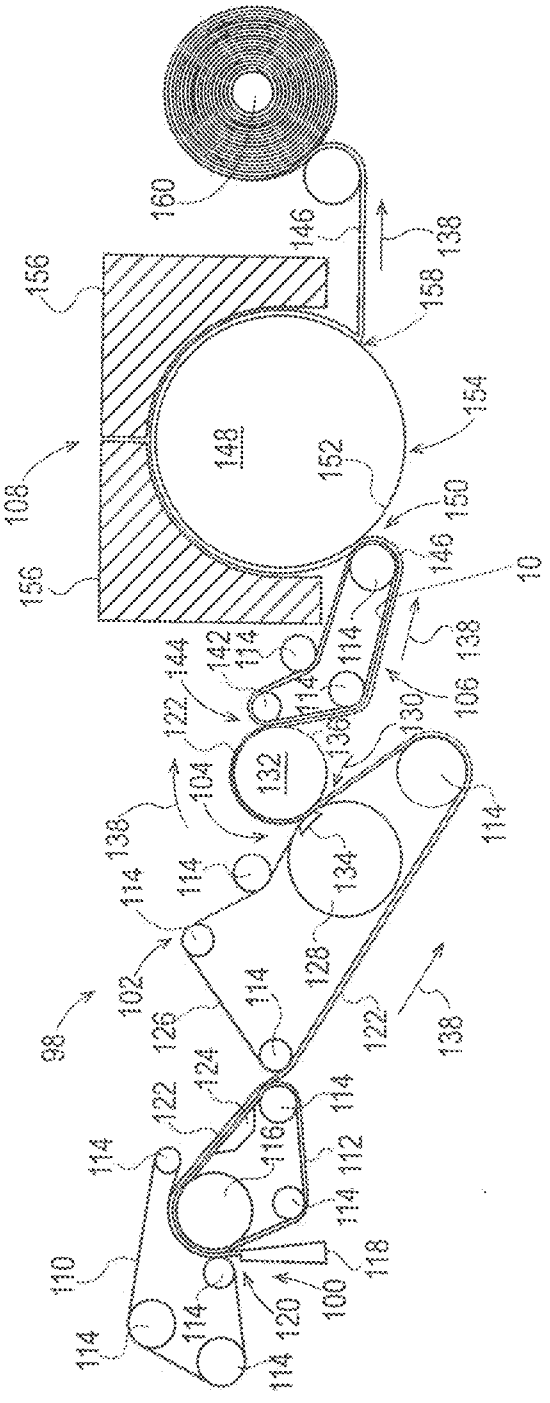
FIG. 15 is a schematic representation of an example of fabric creped papermaking process for making a sanitary tissue product according to the present invention.

Another example of a suitable papermaking process for making the fibrous structures of the present invention is illustrated in FIG. 15. FIG. 15 illustrates an uncreped through-air-drying process. In this example, a multi-layered headbox 74 deposits an aqueous suspension of papermaking fibers between forming wires 76 and 78 to form an embryonic fibrous structure 80.

The embryonic fibrous structure 80 is transferred to a slower moving transfer fabric 82 with the aid of at least one vacuum box 84. The level of vacuum used for the fibrous structure transfers can be from about 3 to about 15 inches of mercury (76 to about 381 millimeters of mercury). The vacuum box 84 (negative pressure) can be supplemented or replaced by the use of positive pressure from the opposite side of the embryonic fibrous structure 80 to blow the embryonic fibrous structure 80 onto the next fabric in addition to or as a replacement for sucking it onto the next fabric with vacuum. Also, a vacuum roll or rolls can be used to replace the vacuum box(es) 84.

The embryonic fibrous structure 80 is then transferred to a molding member 10 according to the present invention, such as a through-air-drying fabric, and passed over through-air-dryers 86 and 88 to dry the embryonic fibrous structure 80 to form a 3D patterned fibrous structure 90. While supported by the molding member 10, the 3D patterned fibrous structure 90 is finally dried to a consistency of about 94% percent or greater. After drying, the 3D patterned fibrous structure 90 is transferred from the molding member 10 to fabric 92 and thereafter briefly sandwiched between fabrics 92 and 94. The dried 3D patterned fibrous structure 90 remains with fabric 94 until it is wound up at the reel 96 ("parent roll") as a finished fibrous structure. Thereafter, the finished 3D patterned fibrous structure 90 can be unwound, calendered and converted into the sanitary tissue product of the present invention, such as a roll of bath tissue, in any suitable manner.

Figure 16:
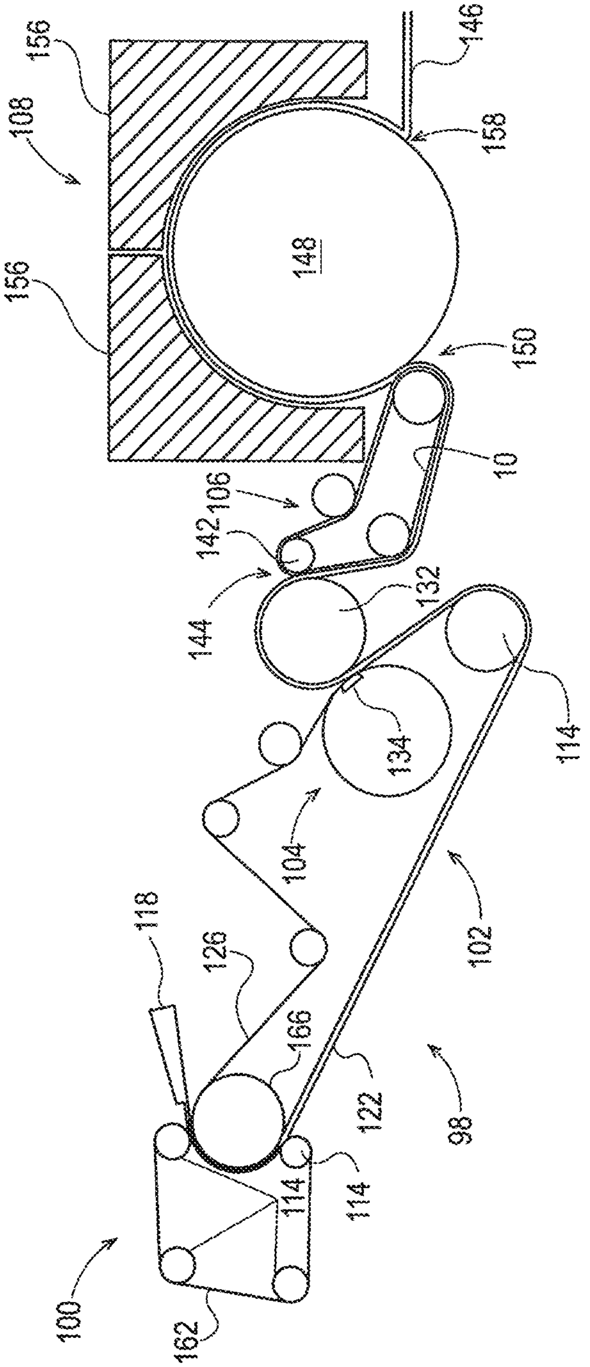
FIG. 16 is a schematic representation of another example of a fabric creped papermaking process for making a sanitary tissue product according to the present invention.

Yet another example of a suitable papermaking process for making the fibrous structures of the present invention is illustrated in FIG. 16. FIG. 16 illustrates a papermaking machine 98 having a conventional twin wire forming section 100, a felt run section 102, a shoe press section 104, a molding member section 106, in this case a creping fabric section, and a Yankee dryer section 108 suitable for practicing the present invention. Forming section 100 includes a pair of forming fabrics 110 and 112 supported by a plurality of rolls 114 and a forming roll 116. A headbox 118 provides papermaking furnish to a nip 120 between forming roll 116 and roll 114 and the fabrics 110 and 112. The furnish forms an embryonic fibrous structure 122 which is dewatered on the fabrics 110 and 112 with the assistance of vacuum, for example, by way of vacuum box 124.

The embryonic fibrous structure 122 is advanced to a papermaking felt 126 which is supported by a plurality of rolls 114 and the felt 126 is in contact with a shoe press roll 128. The embryonic fibrous structure 122 is of low consistency as it is transferred to the felt 126. Transfer may be assisted by vacuum; such as by a vacuum roll if so desired or a pickup or vacuum shoe as is known in the art. As the embryonic fibrous structure 122 reaches the shoe press roll 128 it may have a consistency of 10-25% as it enters the shoe press nip 130 between shoe press roll 128 and transfer roll 132. Transfer roll 132 may be a heated roll if so desired. Instead of a shoe press roll 128, it could be a conventional suction pressure roll. If a shoe press roll 128 is employed it is desirable that roll 114 immediately prior to the shoe press roll 128 is a vacuum roll effective to remove water from the felt 126 prior to the felt 126 entering the shoe press nip 130 since water from the furnish will be pressed into the felt 126 in the shoe press nip 130. In any case, using a vacuum roll at the roll 114 is typically desirable to ensure the embryonic fibrous structure 122 remains in contact with the felt 126 during the direction change as one of skill in the art will appreciate from the diagram.

The embryonic fibrous structure 122 is wet-pressed on the felt 126 in the shoe press nip 130 with the assistance of pressure shoe 134. The embryonic fibrous structure 122 is thus compactively dewatered at the shoe press nip 130, typically by increasing the consistency by 15 or more points at this stage of the process. The configuration shown at shoe press nip 130 is generally termed a shoe press; in connection with the present invention transfer roll 132 is operative as a transfer cylinder which operates to convey embryonic fibrous structure 122 at high speed, typically 1000 feet/minute (fpm) to 6000 fpm to the patterned molding member section 106 of the present invention, for example a creping fabric section.

Transfer roll 132 has a smooth transfer roll surface 136 which may be provided with adhesive and/or release agents if needed. Embryonic fibrous structure 122 is adhered to transfer roll surface 136 which is rotating at a high angular velocity as the embryonic fibrous structure 122 continues to advance in the machine-direction indicated by arrows 138. On the transfer roll 132, embryonic fibrous structure 122 has a generally random apparent distribution of fiber.

Embryonic fibrous structure 122 enters shoe press nip 130 typically at consistencies of 10-25% and is dewatered and dried to consistencies of from about 25 to about 70% by the time it is transferred to the molding member 10 according to the present invention, which in this case is a patterned creping fabric, as shown in the diagram.

Molding member 10 is supported on a plurality of rolls 114 and a press nip roll 142 and forms a molding member nip 144, for example fabric crepe nip, with transfer roll 132 as shown.

The molding member 10 defines a creping nip over the distance in which molding member 10 is adapted to contact transfer roll 132; that is, applies significant pressure to the embryonic fibrous structure 122 against the transfer roll 132. To this end, backing (or creping) press nip roll 142 may be provided with a soft deformable surface which will increase the length of the creping nip and increase the fabric creping angle between the molding member 10 and the embryonic fibrous structure 122 and the point of contact or a shoe press roll could be used as press nip roll 142 to increase effective contact with the embryonic fibrous structure 122 in high impact molding member nip 144 where embryonic fibrous structure 122 is transferred to molding member 10 and advanced in the machine-direction 138. By using different equipment at the molding member nip 144, it is possible to adjust the fabric creping angle or the takeaway angle from the molding member nip 144. Thus, it is possible to influence the nature and amount of redistribution of fiber, delamination/debonding which may occur at molding member nip 144 by adjusting these nip parameters. In some embodiments it may by desirable to restructure the z-direction interfiber characteristics while in other cases it may be desired to influence properties only in the plane of the fibrous structure. The molding member nip parameters can influence the distribution of fiber in the fibrous structure in a variety of directions, including inducing changes in the z-direction as well as the MD and CD. In any case, the transfer from the transfer roll to the molding member is high impact in that the fabric is traveling slower than the fibrous structure and a significant velocity change occurs. Typically, the fibrous structure is creped anywhere from 10-60% and even higher during transfer from the transfer roll to the molding member.

Molding member nip 144 generally extends over a molding member nip distance of anywhere from about ⅛" to about 2", typically ½" to 2". For a molding member 10 according to the present invention, for example creping fabric (fabric creping belt), with 32 CD strands per inch, embryonic fibrous structure 122 thus will encounter anywhere from about 4 to 64 weft filaments in the molding member nip 144.

The nip pressure in molding member nip 144, that is, the loading between roll 142 and transfer roll 132 is suitably 20-100 pounds per linear inch (PLI).

After passing through the molding member nip 144, and for example fabric creping the embryonic fibrous structure 122, a 3D patterned fibrous structure 146 continues to advance along MD 138 where it is wet-pressed onto Yankee cylinder (dryer) 148 in transfer nip 150. Transfer at nip 150 occurs at a 3D patterned fibrous structure 146 consistency of generally from about 25 to about 70%. At these consistencies, it is difficult to adhere the 3D patterned fibrous structure 146 to the Yankee cylinder surface 152 firmly enough to remove the 3D patterned fibrous structure 146 from the molding member 10 thoroughly. This aspect of the process is important, particularly when it is desired to use a high velocity drying hood as well as maintain high impact creping conditions.

In this connection, it is noted that conventional TAD processes do not employ high velocity hoods since sufficient adhesion to the Yankee dryer is not achieved.

It has been found in accordance with the present invention that the use of particular adhesives cooperate with a moderately moist fibrous structure (25-70% consistency) to adhere it to the Yankee dryer sufficiently to allow for high velocity operation of the system and high jet velocity impingement air drying. In this connection, a poly(vinyl alcohol)/polyamide adhesive composition as noted above is applied at 154 as needed.

The 3D patterned fibrous structure is dried on Yankee cylinder 148 which is a heated cylinder and by high jet velocity impingement air in Yankee hood 156. As the Yankee cylinder 148 rotates, 3D patterned fibrous structure 146 is creped from the Yankee cylinder 148 by creping doctor blade 158 and wound on a take-up roll 160. Creping of the paper from a Yankee dryer may be carried out using an undulatory creping blade, such as that disclosed in U.S. Pat. No. 5,690,788, the disclosure of which is incorporated by reference. Use of the undulatory crepe blade has been shown to impart several advantages when used in production of tissue products. In general, tissue products creped using an undulatory blade have higher caliper (thickness), increased CD stretch, and a higher void volume than do comparable tissue products produced using conventional crepe blades. All of these changes affected by the use of the undulatory blade tend to correlate with improved softness perception of the tissue products.

When a wet-crepe process is employed, an impingement air dryer, a through-air dryer, or a plurality of can dryers can be used instead of a Yankee. Impingement air dryers are disclosed in the following patents and applications, the disclosure of which is incorporated herein by reference: U.S. Pat. No. 5,865,955 of Ilvespaaet et al. U.S. Pat. No. 5,968,590 of Ahonen et al. U.S. Pat. No. 6,001,421 of Ahonen et al. U.S. Pat. No. 6,119,362 of Sundqvist et al. U.S. patent application Ser. No. 09/733,172, entitled Wet Crepe, Impingement-Air Dry Process for Making Absorbent Sheet, now U.S. Pat. No. 6,432,267. A throughdrying unit as is well known in the art and described in U.S. Pat. No. 3,432,936 to Cole et al., the disclosure of which is incorporated herein by reference as is U.S. Pat. No. 5,851,353 which discloses a can-drying system.

Figure 17:
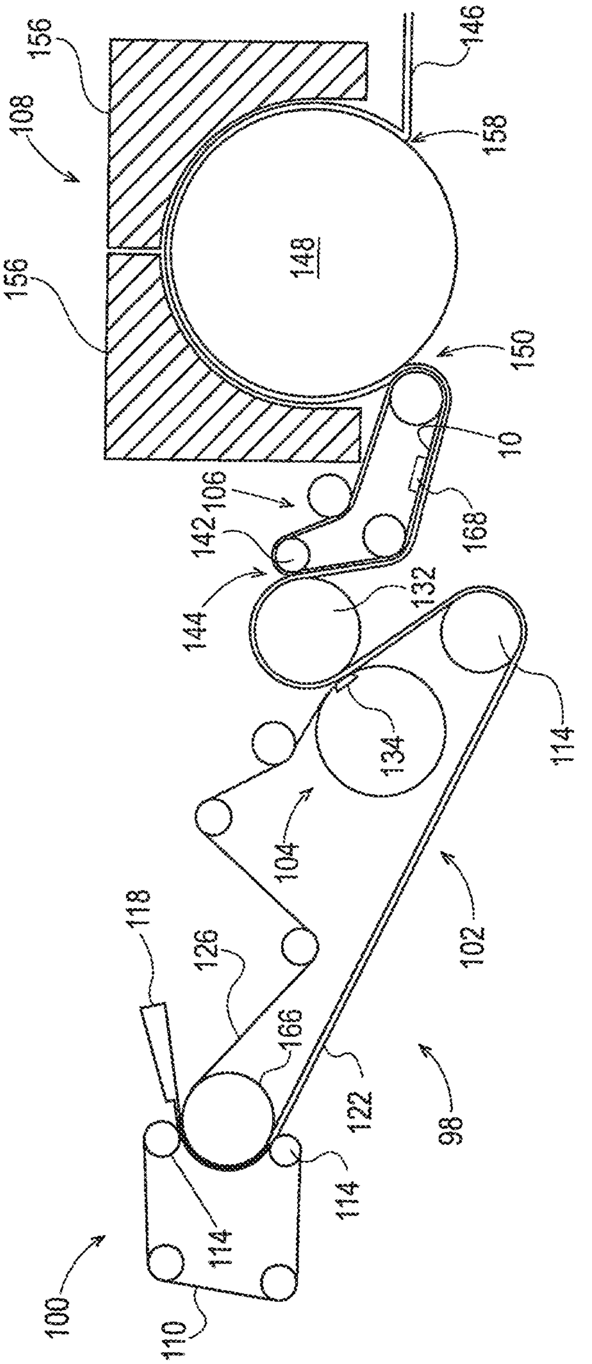
FIG. 17 is a schematic representation of an example of belt creped papermaking process for making a sanitary tissue product according to the present invention.

There is shown in FIG. 17 a papermaking machine 98, similar to FIG. 16, for use in connection with the present invention. Papermaking machine 98 is a three fabric loop machine having a forming section 100 generally referred to in the art as a crescent former. Forming section 100 includes a forming wire 162 supported by a plurality of rolls such as rolls 114. The forming section 100 also includes a forming roll 166 which supports paper making felt 126 such that embryonic fibrous structure 122 is formed directly on the felt 126. Felt run 102 extends to a shoe press section 104 wherein the moist embryonic fibrous structure 122 is deposited on a transfer roll 132 (also referred to sometimes as a backing roll) as described above. Thereafter, embryonic fibrous structure 122 is creped onto molding member 10 according to the present invention, such as a crepe fabric (fabric creping belt), in molding member nip 144 before being deposited on Yankee dryer 148 in another press nip 150. The papermaking machine 98 may include a vacuum turning roll, in some embodiments; however, the three loop system may be configured in a variety of ways wherein a turning roll is not necessary. This feature is particularly important in connection with the rebuild of a papermachine inasmuch as the expense of relocating associated equipment i.e. pulping or fiber processing equipment and/or the large and expensive drying equipment such as the Yankee dryer or plurality of can dryers would make a rebuild prohibitively expensive unless the improvements could be configured to be compatible with the existing facility.

Figure 18:
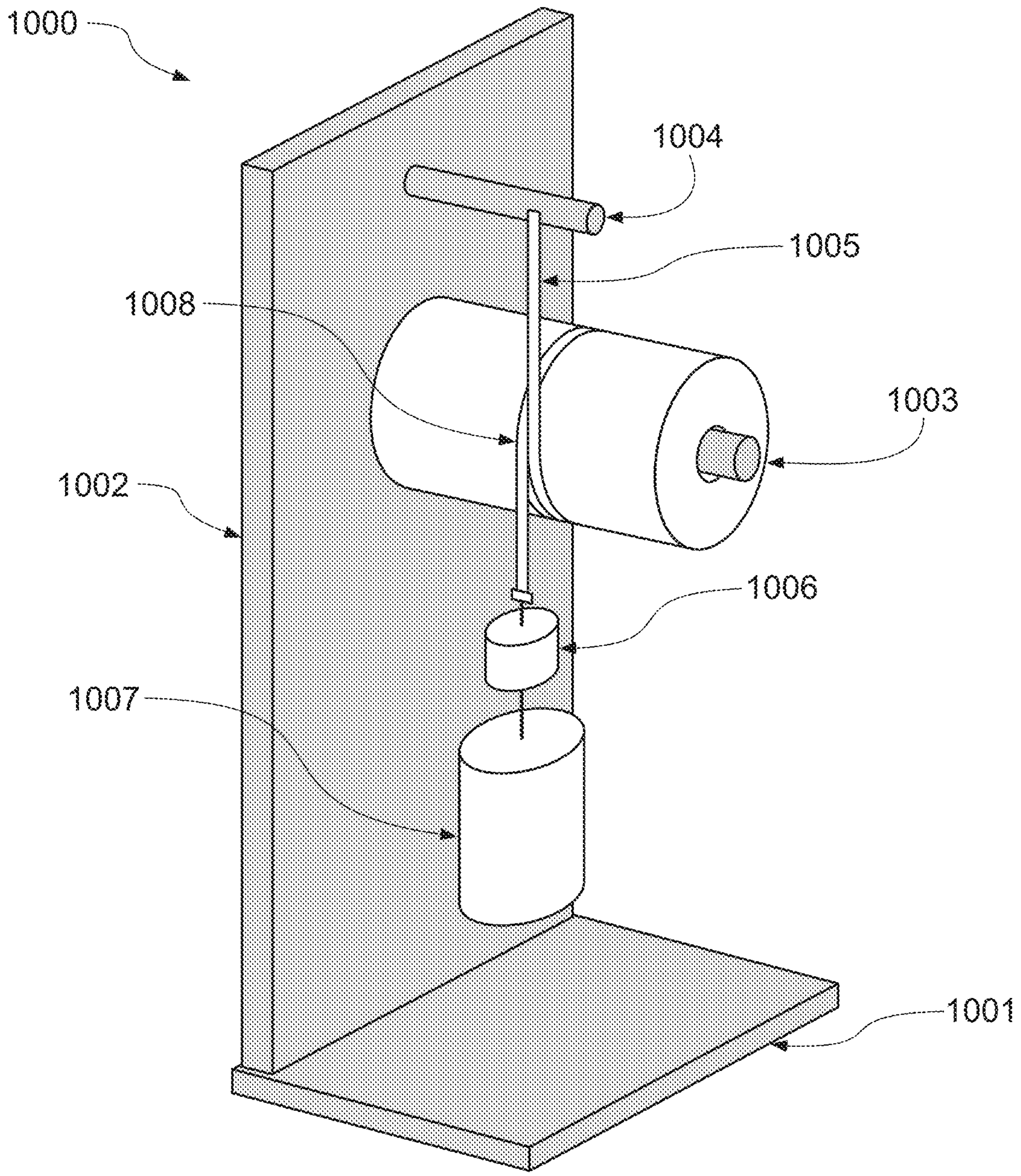
FIG. 18 is a schematic representation of the testing device used in the Roll Compressibility Test Method.

FIG. 18 shows another example of a suitable papermaking process to make the fibrous structures of the present invention. FIG. 18 illustrates a papermaking machine 98 for use in connection with the present invention. Papermaking machine 98 is a three fabric loop machine having a forming section 100, generally referred to in the art as a crescent former. Forming section 100 includes headbox 118 depositing a furnish on forming wire 110 supported by a plurality of rolls 114. The forming section 100 also includes a forming roll 166, which supports papermaking felt 126, such that embryonic fibrous structure 122 is formed directly on felt 126. Felt run 102 extends to a shoe press section 104 wherein the moist embryonic fibrous structure 122 is deposited on a transfer roll 132 and wet-pressed concurrently with the transfer. Thereafter, embryonic fibrous structure 122 is transferred to the molding member section 106, by being transferred to and/or creped onto molding member 10 according to the present invention, such as a creping belt (belt creping) in molding member nip 144, for example belt crepe nip, before being optionally vacuum drawn by suction box 168 and then deposited on Yankee dryer 148 in another press nip 150 using a creping adhesive, as noted above. Transfer to a Yankee dryer from the creping belt differs from conventional transfers in a conventional wet press (CWP) from a felt to a Yankee. In a CWP process, pressures in the transfer nip may be 500 PLI (87.6 kN/meter) or so, and the pressured contact area between the Yankee surface and the fibrous structure is close to or at 100%. The press roll may be a suction roll which may have a P&J hardness of 25-30. On the other hand, a belt crepe process of the present invention typically involves transfer to a Yankee with 4-40% pressured contact area between the fibrous structure and the Yankee surface at a pressure of 250-350 PLI (43.8-61.3 kN/meter). No suction is applied in the transfer nip, and a softer pressure roll is used, P&J hardness 35-45. The papermaking machine may include a suction roll, in some embodiments; however, the three loop system may be configured in a variety of ways wherein a turning roll is not necessary. This feature is particularly important in connection with the rebuild of a papermachine inasmuch as the expense of relocating associated equipment, i.e., the headbox, pulping or fiber processing equipment and/or the large and expensive drying equipment, such as the Yankee dryer or plurality of can dryers, would make a rebuild prohibitively expensive, unless the improvements could be configured to be compatible with the existing facility.

Figure 13:
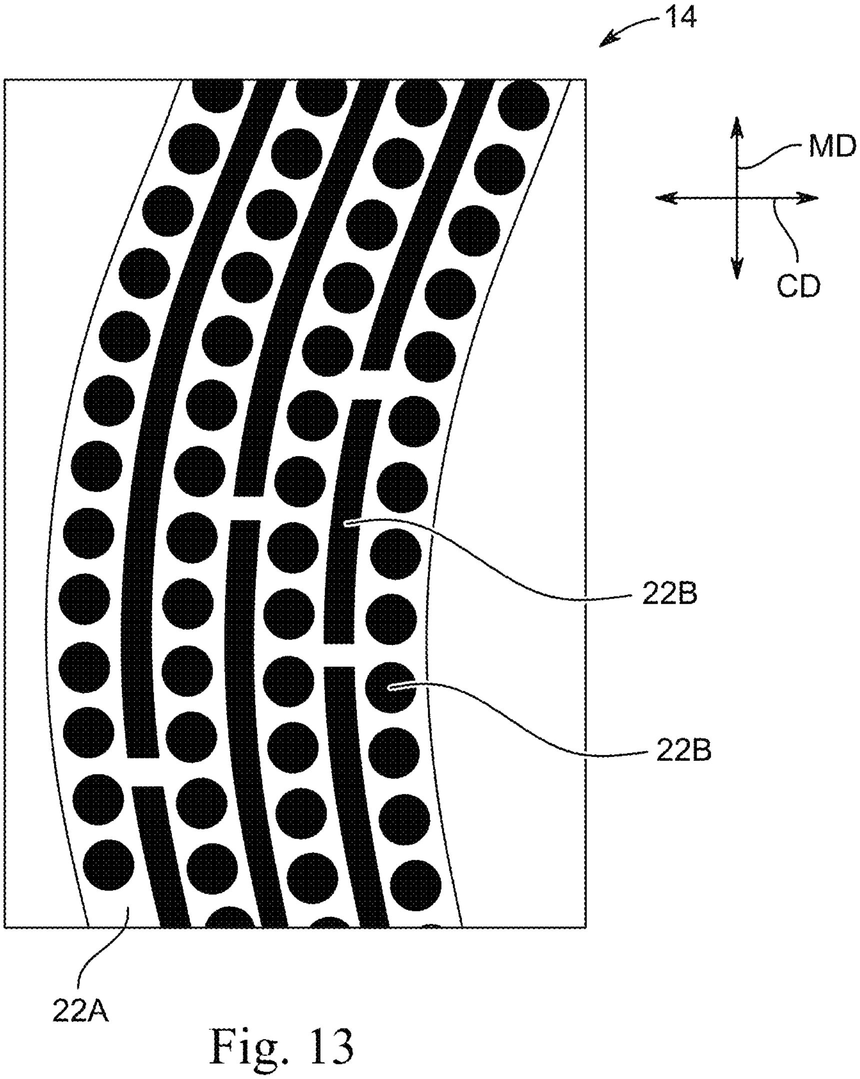
FIG. 13 is a schematic representation of another example of a mask suitable for making a molding member of the present invention.

FIG. 13 is a simplified, schematic representation of one example of a continuous fibrous structure making process and machine useful in the practice of the present disclosure. The following description of the process and machine include non-limiting examples of process parameters useful for making a fibrous structure of the present invention.

As shown in FIG. 13, process and equipment 150 for making fibrous structures according to the present disclosure comprises supplying an aqueous dispersion of fibers (a fibrous furnish) to a headbox 152 which can be of any design known to those of skill in the art. From the headbox 152, the aqueous dispersion of fibers can be delivered to a foraminous member 154, which can be a Fourdrinier wire, to produce an embryonic fibrous web 156.

The foraminous member 154 can be supported by a breast roll 158 and a plurality of return rolls 160 of which only two are illustrated. The foraminous member 154 can be propelled in the direction indicated by directional arrow 162 by a drive means, not illustrated, at a predetermined velocity, V1. Optional auxiliary units and/or devices commonly associated with fibrous structure making machines and with the foraminous member 154, but not illustrated, comprise forming boards, hydrofoils, vacuum boxes, tension rolls, support rolls, wire cleaning showers, and other various components known to those of skill in the art.

After the aqueous dispersion of fibers is deposited onto the foraminous member 154, the embryonic fibrous web 156 is formed, typically by the removal of a portion of the aqueous dispersing medium by techniques known to those skilled in the art. Vacuum boxes, forming boards, hydrofoils, and other various equipment known to those of skill in the art are useful in effectuating water removal. The embryonic fibrous web 156 can travel with the foraminous member 154 about return roll 160 and can be brought into contact with a papermaking belt 164, also referred to as a papermaking belt, in a transfer zone 136, after which the embryonic fibrous web travels on the papermaking belt 164. While in contact with the papermaking belt 164, the embryonic fibrous web 156 can be deflected, rearranged, and/or further dewatered.

The papermaking belt 164 can be in the form of an endless belt. In this simplified representation, the papermaking belt 164 passes around and about papermaking belt return rolls 166 and impression nip roll 168 and can travel in the direction indicated by directional arrow 170, at a papermaking belt velocity V2, which can be less than, equal to, or greater than, the foraminous member velocity V1. In the present invention papermaking belt velocity V2 is less than foraminous member velocity V1 such that the partially-dried fibrous web is foreshortened in the transfer zone 136 by a percentage determined by the relative velocity differential between the foraminous member and the papermaking belt. Associated with the papermaking belt 164, but not illustrated, can be various support rolls, other return rolls, cleaning means, drive means, and other various equipment known to those of skill in the art that may be commonly used in fibrous structure making machines.

The papermaking belts 164 of the present disclosure can be made, or partially made, according to the process described in U.S. Pat. No. 4,637,859, issued Jan. 20, 1987, to Trokhan, and having the patterns of cells as disclosed herein, and can have a pattern of the type described herein, such as the pattern shown in part in FIG. 5.

The fibrous web 192 can then be creped with a creping blade 194 to remove the web 192 from the surface of the Yankee dryer 190 resulting in the production of a creped fibrous structure 196 in accordance with the present disclosure. As used herein, creping refers to the reduction in length of a dry (having a consistency of at least about 90% and/or at least about 95%) fibrous web which occurs when energy is applied to the dry fibrous web in such a way that the length of the fibrous web is reduced and the fibers in the fibrous web are rearranged with an accompanying disruption of fiber-fiber bonds. Creping can be accomplished in any of several ways as is well known in the art. The creped fibrous structure 196 is wound on a reel, commonly referred to as a parent roll, and can be subjected to post processing steps such as calendaring, tuft generating operations, embossing, and/or converting. The reel winds the creped fibrous structure at a reel surface velocity, V4.

As discussed above, the fibrous structure can be embossed during a converting operating to produce the embossed fibrous structures of the present disclosure.

Non-Limiting Examples of Methods for Making Fibrous Structures

The following illustrates a non-limiting example for a preparation of a fibrous structure and/or sanitary tissue product according to the present invention on a pilot-scale Fourdrinier fibrous structure making (papermaking) machine.

Example 1

An aqueous slurry of eucalyptus (Fibria Brazilian bleached hardwood kraft pulp) pulp fibers is prepared at about 3% fiber by weight using a conventional repulper, then transferred to the hardwood fiber stock chest. The eucalyptus fiber slurry of the hardwood stock chest is pumped through a stock pipe to a hardwood fan pump where the slurry consistency is reduced from about 3% by fiber weight to about 0.15% by fiber weight. The 0.15% eucalyptus slurry is then pumped and equally distributed in the top and bottom chambers of a multi-layered, three-chambered headbox of a Fourdrinier wet-laid papermaking machine.

Additionally, an aqueous slurry of NSK (Northern Softwood Kraft) pulp fibers is prepared at about 3% fiber by weight using a conventional repulper, then transferred to the softwood fiber stock chest. The NSK fiber slurry of the softwood stock chest is pumped through a stock pipe to be refined to a Canadian Standard Freeness (CSF) of about 630. The refined NSK fiber slurry is then directed to the NSK fan pump where the NSK slurry consistency is reduced from about 3% by fiber weight to about 0.15% by fiber weight. The 0.15% NSK slurry is then directed and distributed to the center chamber of a multi-layered, three-chambered headbox of a Fourdrinier wet-laid papermaking machine.

In order to impart temporary wet strength to the finished fibrous structure, a 1% dispersion of temporary wet strengthening additive (e.g., Fennorez® 91 commercially available from Kemira) is prepared and is added to the NSK fiber stock pipe at a rate sufficient to deliver 0.28% temporary wet strengthening additive based on the dry weight of the NSK fibers. The absorption of the temporary wet strengthening additive is enhanced by passing the treated slurry through an in-line mixer.

The wet-laid papermaking machine has a layered headbox having a top chamber, a center chamber, and a bottom chamber where the chambers feed directly onto the forming wire (Fourdrinier wire). The eucalyptus fiber slurry of 0.15% consistency is directed to the top headbox chamber and bottom headbox chamber. The NSK fiber slurry is directed to the center headbox chamber. All three fiber layers are delivered simultaneously in superposed relation onto the Fourdrinier wire to form thereon a three-layer embryonic fibrous structure (web), of which about 35% of the top side is made up of the eucalyptus fibers, about 20% is made of the eucalyptus fibers on the center/bottom side and about 45% is made up of the NSK fibers in the center/bottom side. Dewatering occurs through the Fourdrinier wire and is assisted by a deflector and wire table vacuum boxes. The Fourdrinier wire is an 84M (84 by 76 5A, Albany International). The speed of the Fourdrinier wire is about 815 feet per minute (fpm).

Figure 6:
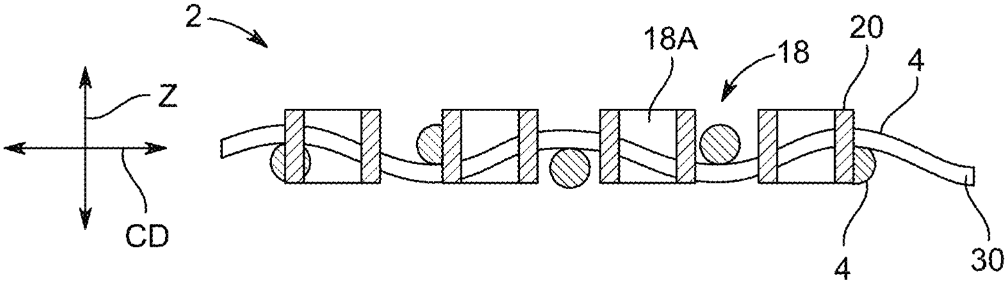
FIG. 6 is cross-sectional view of the papermaking belt of FIG. 5 taken at Section 6-6.

The embryonic wet fibrous structure is transferred from the Fourdrinier wire, at a fiber consistency of about 18-22% at the point of transfer, to a molding member according to the present invention, such as the molding member shown in FIGS. 5 and 6, which can also be referred to as 3D patterned, semi-continuous knuckle, through-air-drying belt. The speed of the 3D patterned through-air-drying belt is about 800 feet per minute (fpm), which is 2% slower than the speed of the Fourdrinier wire. The 3D patterned through-air-drying belt is designed to yield a fibrous structure as shown in FIG. 3 comprising a pattern of semi-continuous high density knuckle regions substantially oriented in the machine direction having discrete pillow regions dispersed along the length of the knuckle regions. Each semi-continuous high density knuckle (a semi-continuous pillow region) region substantially oriented in the machine direction is separated by a low density pillow region substantially oriented in the machine direction. This 3D patterned through-air-drying belt is formed by casting a layer of an impervious resin surface of semi-continuous knuckles onto a fiber mesh reinforcing member 6 similar to that shown in FIG. 5. The supporting fabric is a 98×52 filament, dual layer fine mesh. The thickness of the resin cast is about 15 mils above the supporting fabric, i.e., in the Z-direction as shown in FIG. 6. The semi-continuous knuckles and pillows can be straight, curvilinear, or partially straight or partially curvilinear.

Further de-watering of the fibrous structure is accomplished by vacuum assisted drainage until the fibrous structure has a fiber consistency of about 20% to 30%.

While remaining in contact with the molding member (3D patterned through-air-drying belt), the fibrous structure is pre-dried by air blow-through pre-dryers to a fiber consistency of about 50-65% by weight.

After the pre-dryers, the semi-dry fibrous structure is transferred to a Yankee dryer and adhered to the surface of the Yankee dryer with a sprayed creping adhesive. The creping adhesive is an aqueous dispersion with the actives consisting of about 80% polyvinyl alcohol (PVA 88-44), about 20% UNICREPE® 457T20. UNICREPER 457T20 is commercially available from GP Chemicals. The creping adhesive is delivered to the Yankee surface at a rate of about 0.10-0.20% adhesive solids based on the dry weight of the fibrous structure. The fiber consistency is increased to about 96-99% before the fibrous structure is dry-creped from the Yankee with a doctor blade.

The doctor blade has a bevel angle of about 25° and is positioned with respect to the Yankee dryer to provide an impact angle of about 81°. The Yankee dryer is operated at a temperature of about 350° F. and a speed of about 800 fpm. The fibrous structure is wound in a roll (parent roll) using a surface driven reel drum having a surface speed of about 720 fpm.

Two parent rolls of the fibrous structure are then converted into a sanitary tissue product by loading the roll of fibrous structure into an unwind stand. The two parent rolls are converted with the low density pillow side out (fabric side out or "FSO"). The line speed is 900 ft/min. One parent roll of the fibrous structure is unwound and transported to an emboss stand where the fibrous structure is strained to form an emboss pattern in the fibrous structure via a pressure roll nip and then combined with the fibrous structure from the other parent roll to make a multi-ply (2-ply) sanitary tissue product. Approximately 0.5% of a quaternary amine softener is added to the top side only of the multi-ply sanitary tissue product. The multi-ply sanitary tissue product is then transported to a winder where it is wound onto a core to form a log. The log of multi-ply sanitary tissue product is then transported to a log saw where the log is cut into finished multi-ply sanitary tissue product rolls. The sanitary tissue product is soft, flexible and absorbent.

Example 2

A fibrous structure is made as described in Example 1 except the fiber content is as follows: about 27% of the bottom side is made up of the eucalyptus fibers, about 20% is made of the eucalyptus fibers on the center/top side and about 53% is made up of the NSK fibers in the center/top side. Two parent rolls of the fibrous structure are then converted into a sanitary tissue product by loading the roll of fibrous structure into an unwind stand. The two parent rolls are converted with the low density pillow side in (wire side out or "WSO"). The line speed is 900 ft/min. One parent roll of the fibrous structure is unwound and transported to an emboss stand where the fibrous structure is strained to form an emboss pattern in the fibrous structure via a pressure roll nip and then combined with the fibrous structure from the other parent roll to make a multi-ply (2-ply) sanitary tissue product. Approximately 0.5% of a quaternary amine softener is added to the top side only of the multi-ply sanitary tissue product. The multi-ply sanitary tissue product is then transported to a winder where it is wound onto a core to form a log. The log of multi-ply sanitary tissue product is then transported to a log saw where the log is cut into finished multi-ply sanitary tissue product rolls. The sanitary tissue product is soft, flexible and absorbent.

Example 3

A fibrous structure is made as described in Example 2 except the fiber content is as follows: about 35% of the bottom side is made up of the eucalyptus fibers, about 15% is made of the eucalyptus fibers on the center/top side and about 50% is made up of the NSK fibers in the center/top side. The sanitary tissue product is soft, flexible and absorbent.

Example 4

A fibrous structure is made as described in Example 2 except the fiber content is as follows: about 35% of the bottom side is made up of the eucalyptus fibers, about 10% is made of the eucalyptus fibers on the center/top side and about 55% is made up of the NSK fibers in the center/top side. The sanitary tissue product is soft, flexible and absorbent.

Example 5

A fibrous structure is made as described in Example 2 except the fiber content is as follows: about 40% of the bottom side is made up of the eucalyptus fibers, about 5% is made of the eucalyptus fibers on the center/top side and about 55% is made up of the NSK fibers in the center/top side. The sanitary tissue product is soft, flexible and absorbent.

Example 6

A fibrous structure is made as described in Example 2 except the fiber content is as follows: about 40% of the bottom side is made up of the eucalyptus fibers, about 10% is made of the eucalyptus fibers on the center/top side and about 50% is made up of the NSK fibers in the center/top side. The sanitary tissue product is soft, flexible and absorbent.

Example 7

A fibrous structure is made as described in Example 2 except the fiber content is as follows: about 45% of the bottom side is made up of the eucalyptus fibers, about 10% is made of the eucalyptus fibers on the center/top side and about 45% is made up of the NSK fibers in the center/top side. The sanitary tissue product is soft, flexible and absorbent.

Example 8

A fibrous structure is made as described in Example 1 except the fiber content is as follows: about 27% of the top side is made up of the eucalyptus fibers, about 20% is made of the eucalyptus fibers on the center/bottom side and about 53% is made up of the NSK fibers in the center/bottom side. The sanitary tissue product is soft, flexible and absorbent.

Example 9

A fibrous structure is made as described in Example 1 except the fiber content is as follows: about 35% of the top side is made up of the eucalyptus fibers, about 15% is made of the eucalyptus fibers on the center/bottom side and about 50% is made up of the NSK fibers in the center/bottom side. The sanitary tissue product is soft, flexible and absorbent.

Example 10

A fibrous structure is made as described in Example 1 except the fiber content is as follows: about 35% of the top side is made up of the eucalyptus fibers, about 10% is made of the eucalyptus fibers on the center/bottom side and about 55% is made up of the NSK fibers in the center/bottom side. The sanitary tissue product is soft, flexible and absorbent.

Example 11

A fibrous structure is made as described in Example 1 except the fiber content is as follows: about 40% of the top side is made up of the eucalyptus fibers, about 5% is made of the eucalyptus fibers on the center/bottom side and about 55% is made up of the NSK fibers in the center/bottom side. The sanitary tissue product is soft, flexible and absorbent.

Example 12

A fibrous structure is made as described in Example 1 except the fiber content is as follows: about 40% of the top side is made up of the eucalyptus fibers, about 10% is made of the eucalyptus fibers on the center/bottom side and about 50% is made up of the NSK fibers in the center/bottom side. The sanitary tissue product is soft, flexible and absorbent.

Example 13

A fibrous structure is made as described in Example 1 except the fiber content is as follows: about 45% of the top side is made up of the eucalyptus fibers, about 10% is made of the eucalyptus fibers on the center/bottom side and about 45% is made up of the NSK fibers in the center/bottom side. The sanitary tissue product is soft, flexible and absorbent.

An example of fibrous structures in accordance with the present disclosure can be prepared using a papermaking machine as described above with respect to FIG. 13, and according to the method described below.

The following illustrates a non-limiting example for a preparation of a sanitary tissue product according to the present invention on a pilot-scale Fourdrinier fibrous structure making (papermaking) machine.

An aqueous slurry of eucalyptus (Fibria Brazilian bleached hardwood kraft pulp) pulp fibers is prepared at about 3% fiber by weight using a conventional repulper, then transferred to the hardwood fiber stock chest. The eucalyptus fiber slurry of the hardwood stock chest is pumped through a stock pipe to a hardwood fan pump where the slurry consistency is reduced from about 3% by fiber weight to about 0.15% by fiber weight. The 0.15% eucalyptus slurry is then pumped and equally distributed in the top and bottom chambers of a multi-layered, three-chambered headbox of a Fourdrinier wet-laid papermaking machine.

Additionally, an aqueous slurry of NSK (Northern Softwood Kraft) pulp fibers is prepared at about 3% fiber by weight using a conventional repulper, then transferred to the softwood fiber stock chest. The NSK fiber slurry of the softwood stock chest is pumped through a stock pipe to be refined to a Canadian Standard Freeness (CSF) of about 630. The refined NSK fiber slurry is then directed to the NSK fan pump where the NSK slurry consistency is reduced from about 3% by fiber weight to about 0.15% by fiber weight. The 0.15% NSK slurry is then directed and distributed to the center chamber of a multi-layered, three-chambered headbox of a Fourdrinier wet-laid papermaking machine.

In order to impart temporary wet strength to the finished fibrous structure, a 1% dispersion of temporary wet strengthening additive (e.g., Fennorez® 91 commercially available from Kemira) is prepared and is added to the NSK fiber stock pipe at a rate sufficient to deliver 0.28% temporary wet strengthening additive based on the dry weight of the NSK fibers. The absorption of the temporary wet strengthening additive is enhanced by passing the treated slurry through an in-line mixer.

The wet-laid papermaking machine has a layered headbox having a top chamber, a center chamber, and a bottom chamber where the chambers feed directly onto the forming wire (Fourdrinier wire). The eucalyptus fiber slurry of 0.15% consistency is directed to the top headbox chamber and bottom headbox chamber. The NSK fiber slurry is directed to the center headbox chamber. All three fiber layers are delivered simultaneously in superposed relation onto the Fourdrinier wire to form thereon a three-layer embryonic fibrous structure (web), of which about 35% of the top side is made up of the eucalyptus fibers, about 20% is made of the eucalyptus fibers on the center/bottom side and about 55% is made up of the NSK fibers in the center/bottom side. Dewatering occurs through the Fourdrinier wire and is assisted by a deflector and wire table vacuum boxes. The Fourdrinier wire is an 84M (84 by 76 5A, Albany International). The speed of the Fourdrinier wire is about 815 feet per minute (fpm).

The embryonic wet fibrous structure is transferred from the Fourdrinier wire, at a fiber consistency of about 18-22% at the point of transfer, to a 3D patterned, semi-continuous knuckle, through-air-drying belt, a portion of which is shown in FIG. 5. The speed of the 3D patterned through-air-drying belt is about 800 feet per minute (fpm), which is 2% slower than the speed of the Fourdrinier wire. The 3D patterned through-air-drying belt is designed to yield a fibrous structure as shown in FIG. 3 comprising a pattern of semi-continuous high density knuckle regions substantially oriented in the machine direction. Each semi-continuous high density knuckle region substantially oriented in the machine direction is separated by a low density pillow region substantially oriented in the machine direction. This 3D patterned through-air-drying belt is formed by casting a layer of an impervious resin surface of semi-continuous knuckles onto a fiber mesh reinforcing member 6 similar to that shown in FIG. 5. The supporting fabric is a 98×52 filament, dual layer fine mesh. The thickness of the resin cast is about 15 mils above the supporting fabric, i.e., in the Z-direction as shown in FIG. 6. The semi-continuous knuckles and pillows can be straight, curvilinear, or partially straight or partially curvilinear.

Further de-watering of the fibrous structure is accomplished by vacuum assisted drainage until the fibrous structure has a fiber consistency of about 20% to 30%.

While remaining in contact with the 3D patterned through-air-drying belt, the fibrous structure is pre-dried by air blow-through pre-dryers to a fiber consistency of about 50-65% by weight.

After the pre-dryers, the semi-dry fibrous structure is transferred to a Yankee dryer and adhered to the surface of the Yankee dryer with a sprayed creping adhesive. The creping adhesive is an aqueous dispersion with the actives consisting of about 80% polyvinyl alcohol (PVA 88-44), about 20% UNICREPE® 457T20. UNICREPE® 457T20 is commercially available from GP Chemicals. The creping adhesive is delivered to the Yankee surface at a rate of about 0.10-0.20% adhesive solids based on the dry weight of the fibrous structure. The fiber consistency is increased to about 96-99% before the fibrous structure is dry-creped from the Yankee with a doctor blade.

The doctor blade has a bevel angle of about 25° and is positioned with respect to the Yankee dryer to provide an impact angle of about 81°. The Yankee dryer is operated at a temperature of about 350° F. and a speed of about 800 fpm. The fibrous structure is wound in a roll (parent roll) using a surface driven reel drum having a surface speed of about 720 fpm.

Two parent rolls of the fibrous structure are then converted into a sanitary tissue product by loading the roll of fibrous structure into an unwind stand. The two parent rolls are converted with the low density pillow side out. The line speed is 900 ft/min. One parent roll of the fibrous structure is unwound and transported to an emboss stand where the fibrous structure is strained to form an emboss pattern in the fibrous structure via a pressure roll nip and then combined with the fibrous structure from the other parent roll to make a multi-ply (2-ply) sanitary tissue product. Approximately 0.5% of a quaternary amine softener is added to the top side only of the multi-ply sanitary tissue product. The multi-ply sanitary tissue product is then transported to a winder where it is wound onto a core to form a log. The log of multi-ply sanitary tissue product is then transported to a log saw where the log is cut into finished multi-ply sanitary tissue product rolls.

In one embodiment two plies each having three layers from a three-layer headbox are combined wire side out, with the wire-side layer containing 27% Eucalyptus, the center and fabric layer containing a mixture of 53% NSK, and 20% Eucalyptus. The sanitary tissue product is soft, flexible and absorbent and has a high substrate volume in the form of surface volume.

In one embodiment two plies each having two layers from a three-layer headbox are combined wire side out, with the wire-side layer containing 45% Eucalyptus, and the center and fabric-side layer together containing 55% NSK. The sanitary tissue product is soft, flexible and absorbent and has a high substrate volume in the form of surface volume.

In one embodiment two plies each having three layers from a three-layer headbox are combined fabric side out, with the wire-side and center layer containing a mixture of 10% Eucalyptus, and 54% NSK, and the fabric-side layer containing 36% Eucalyptus. The sanitary tissue product is soft, flexible and absorbent and has a high substrate volume in the form of surface volume.

In one embodiment two plies each having three layers from a three-layer headbox are combined fabric side out, with the wire-side and center layer containing a mixture of 5% Eucalyptus, and 52% NSK, and the fabric-side layer containing 42% Eucalyptus. The sanitary tissue product is soft, flexible and absorbent and has a high substrate volume in the form of surface volume.

In one embodiment two plies each having three layers from a three-layer headbox are combined fabric side out, with the wire-side and center layer containing a mixture of 7% Eucalyptus and 58% NSK, and the fabric-side layer containing 35% Eucalyptus. The sanitary tissue product is soft, flexible and absorbent and has a high substrate volume in the form of surface volume.

In one embodiment two plies each having three layers from a three-layer headbox are combined fabric side out, with the wire-side and center layer containing a mixture 22% Eucalyptus, and 53% NSK, fabric-side layer containing 25% Eucalyptus. The sanitary tissue product is soft, flexible and absorbent and has a high substrate volume in the form of surface volume.

In one embodiment two plies each having two layers from a three-layer headbox are combined fabric side out, with the wire-side layer containing 51% NSK, fabric-side layer together containing 49% Eucalyptus. The sanitary tissue product is soft, flexible and absorbent and has a high substrate volume in the form of surface volume.

In one embodiment two plies each having two layers from a three-layer headbox are combined fabric side out, with the wire-side layer containing 54% NSK, and fabric-side layer containing 46% Eucalyptus. The sanitary tissue product is soft, flexible and absorbent and has a high substrate volume in the form of surface volume.

In one embodiment two plies each having two layers from a three-layer headbox are combined fabric side out, with the wire-side layer containing 51% NSK, and fabric-side layer together containing 49% Eucalyptus. The sanitary tissue product is soft, flexible and absorbent and has a high substrate volume in the form of surface volume.

In one embodiment two plies each having two layers from a three-layer headbox are combined fabric side out, with the wire-side layer containing 55% NSK, and fabric-side layer together containing 45% Eucalyptus. The sanitary tissue product is soft, flexible and absorbent and has a high substrate volume in the form of surface volume.

Test Methods

Unless otherwise specified, all tests described herein including those described under the Definitions section and the following test methods are conducted on samples that have been conditioned in a conditioned room at a temperature of 23° C.±1.0° C. and a relative humidity of 50%+2% for a minimum of 2 hours prior to the test. The samples tested are "usable units." "Usable units" as used herein means sheets, flats from roll stock, pre-converted flats, and/or single or multi-ply products. All tests are conducted in such conditioned room. Do not test samples that have defects such as wrinkles, tears, holes, and like. All instruments are calibrated according to manufacturer's specifications.

Basis Weight Test Method

Basis weight of a fibrous structure and/or sanitary tissue product is measured on stacks of twelve usable units using a top loading analytical balance with a resolution of ±0.001 g. The balance is protected from air drafts and other disturbances using a draft shield. A precision cutting die, measuring 3.500 in±0.0035 in by 3.500 in±0.0035 in is used to prepare all samples. With a precision cutting die, cut the samples into squares. Combine the cut squares to form a stack twelve samples thick. Measure the mass of the sample stack and record the result to the nearest 0.001 g.

The Basis Weight is calculated in lbs/3000 $ft^2$ or $g/m^2$ as follows:

$$\text{Basis Weight}=(\text{Mass of stack})/[(\text{Area of 1 square in stack})\times(\text{No. of squares in stack})]$$

For example, $$\text{Basis Weight (lbs/3000 ft}^2)=[[\text{Mass of stack (g)}/453.6\ (\text{g/lbs})]/[12.25\ (\text{in}^2)/144\ (\text{in}^2/\text{ft}^2)\times 12]]\times 3000$$

or, $$\text{Basis Weight (g/m}^2)=\text{Mass of stack (g)}/[79.032\ (\text{cm}^2)/10{,}000\ (\text{cm}^2/\text{m}^2)\times 12]$$

Report result to the nearest 0.1 lbs/3000 $ft^2$ or 0.1 $g/m^2$. Sample dimensions can be changed or varied using a similar precision cutter as mentioned above, so as at least 100 square inches of sample area in stack.

Caliper Test Method

Dry caliper of a fibrous structure and/or sanitary tissue product is measured using a ProGage Thickness Tester (Thwing-Albert Instrument Company, West Berlin, NJ) with a pressure foot diameter of 5.08 cm (area of 6.45 $cm^2$) at a pressure of 14.73 $g/cm^2$. Four (4) samples are prepared by cutting of a usable unit such that each cut sample is at least 16.13 cm per side, avoiding creases, folds, and obvious defects. An individual specimen is placed on the anvil with the specimen centered underneath the pressure foot. The foot is lowered at 0.076 cm/see to an applied pressure of 14.73 g/cm$^2$. The reading is taken after 3 sec dwell time, and the foot is raised. The measure is repeated in like fashion for the remaining 3 specimens. The caliper is calculated as the average caliper of the four specimens and is reported in mils (0.001 in) to the nearest 0.1 mils.

Wet caliper is tested in the same manner, using 2 replicates. An individual replicate is placed on the anvil and wetted from the center, one drop at a time, with distilled or deionized water at the temperature of the conditioned room. Saturate the sample, adding enough water such that the sample is thoroughly wetted (from a visual perspective), with no observed dry areas anywhere on the sample. Continue with the measurement as described above.

Density Test Method

The density of a fibrous structure and/or sanitary tissue product is calculated as the quotient of the Basis Weight of a fibrous structure or sanitary tissue product expressed in lbs/3000 ft$^2$ divided by the Caliper (at 95 g/in$^2$) of the fibrous structure or sanitary tissue product expressed in mils. The final Density value is calculated in lbs/ft$^3$ and/or g/cm$^3$, by using the appropriate converting factors.

Roll Compressibility Test Method

Figure 19:
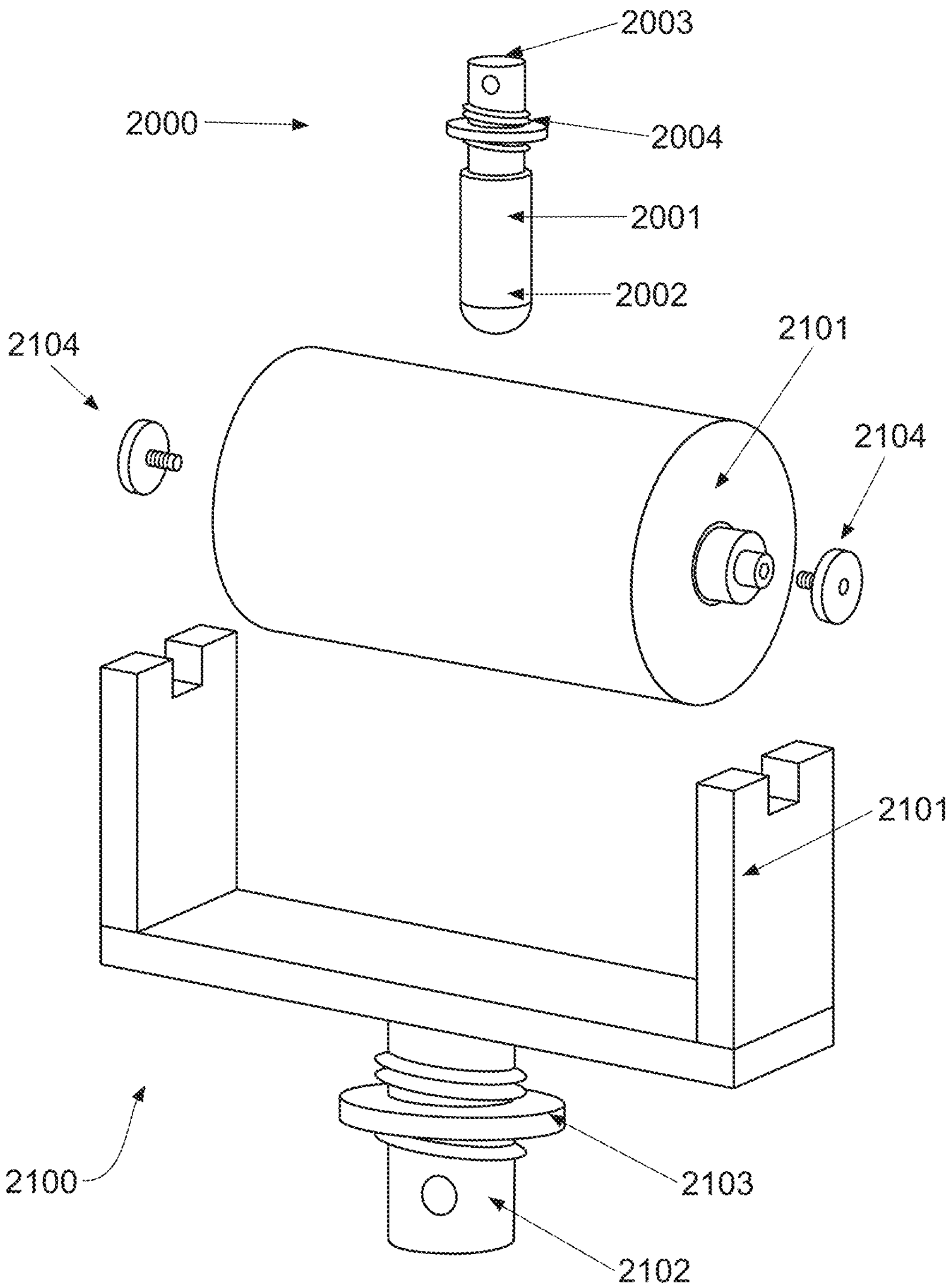
FIG. 19 is a schematic representation of the testing device used in the Roll Firmness Test Method.

Percent Roll Compressibility is determined using the Roll Diameter Tester 1000 as shown in FIG. 19. It is comprised of a support stand made of two aluminum plates, a base plate 1001 and a vertical plate 1002 mounted perpendicular to the base, a sample shaft 1003 to mount the test roll, and a bar 1004 used to suspend a precision diameter tape 1005 that wraps around the circumference of the test roll. Two different weights 1006 and 1007 are suspended from the diameter tape to apply a confining force during the uncompressed and compressed measurement. All testing is performed in a conditioned room maintained at about 23° C.±2 C.° and about 50%±2% relative humidity.

The diameter of the test roll is measured directly using a Pi® tape or equivalent precision diameter tape (e.g. an Executive Diameter tape available from Apex Tool Group, LLC, Apex, NC, Model No. W606PD) which converts the circumferential distance into a diameter measurement so the roll diameter is directly read from the scale. The diameter tape is graduated to 0.01 inch increments with accuracy certified to 0.001 inch and traceable to NIST. The tape is 0.25 in wide and is made of flexible metal that conforms to the curvature of the test roll but is not elongated under the 1100 g loading used for this test. If necessary the diameter tape is shortened from its original length to a length that allows both of the attached weights to hang freely during the test, yet is still long enough to wrap completely around the test roll being measured. The cut end of the tape is modified to allow for hanging of a weight (e.g. a loop). All weights used are calibrated, Class F hooked weights, traceable to NIST.

The aluminum support stand is approximately 600 mm tall and stable enough to support the test roll horizontally throughout the test. The sample shaft 1003 is a smooth aluminum cylinder that is mounted perpendicularly to the vertical plate 1002 approximately 485 mm from the base. The shaft has a diameter that is at least 90% of the inner diameter of the roll and longer than the width of the roll. A small steal bar 1004 approximately 6.3 mm diameter is mounted perpendicular to the vertical plate 1002 approximately 570 mm from the base and vertically aligned with the sample shaft. The diameter tape is suspended from a point along the length of the bar corresponding to the midpoint of a mounted test roll. The height of the tape is adjusted such that the zero mark is vertically aligned with the horizontal midline of the sample shaft when a test roll is not present.

Condition the samples at about 23° C.±2 C.° and about 50%±2% relative humidity for 2 hours prior to testing. Rolls with cores that are crushed, bent or damaged should not be tested. Place the test roll on the sample shaft 1003 such that the direction the paper was rolled onto its core is the same direction the diameter tape will be wrapped around the test roll. Align the midpoint of the roll's width with the suspended diameter tape. Loosely loop the diameter tape 1004 around the circumference of the roll, placing the tape edges directly adjacent to each other with the surface of the tape lying flat against the test sample. Carefully, without applying any additional force, hang the 100 g weight 1006 from the free end of the tape, letting the weighted end hang freely without swinging. Wait 3 seconds. At the intersection of the diameter tape 1008, read the diameter aligned with the zero mark of the diameter tape and record as the Original Roll Diameter to the nearest 0.01 inches. With the diameter tape still in place, and without any undue delay, carefully hang the 1000 g weight 1007 from the bottom of the 100 g weight, for a total weight of 1100 g. Wait 3 seconds. Again read the roll diameter from the tape and record as the Compressed Roll Diameter to the nearest 0.01 inch. Calculate roll compressibility according to the following equation and record to the nearest 0.1%:

$$\%\ \text{Compressibility} = \frac{(\text{Original Roll Diameter}) - (\text{Compressed Roll Diameter})}{\text{Original Roll Diameter}} \times 100$$

Repeat the testing on 10 replicate rolls and record the separate results to the nearest 0.1%. Average the 10 results and report as the Roll Compressibility to the nearest 0.1%.

Roll Firmness Test Method

Roll Firmness is measured on a constant rate of extension tensile tester with computer interface (a suitable instrument is the MTS Alliance using Testworks 4.0 Software, as available from MTS Systems Corp., Eden Prairie, MN) using a load cell for which the forces measured are within 10% to 90% of the limit of the cell. The roll product is held horizontally, a cylindrical probe is pressed into the test roll, and the compressive force is measured versus the depth of penetration. All testing is performed in a conditioned room maintained at 23° C.±2C° and 50%±2% relative humidity.

Figure 20:
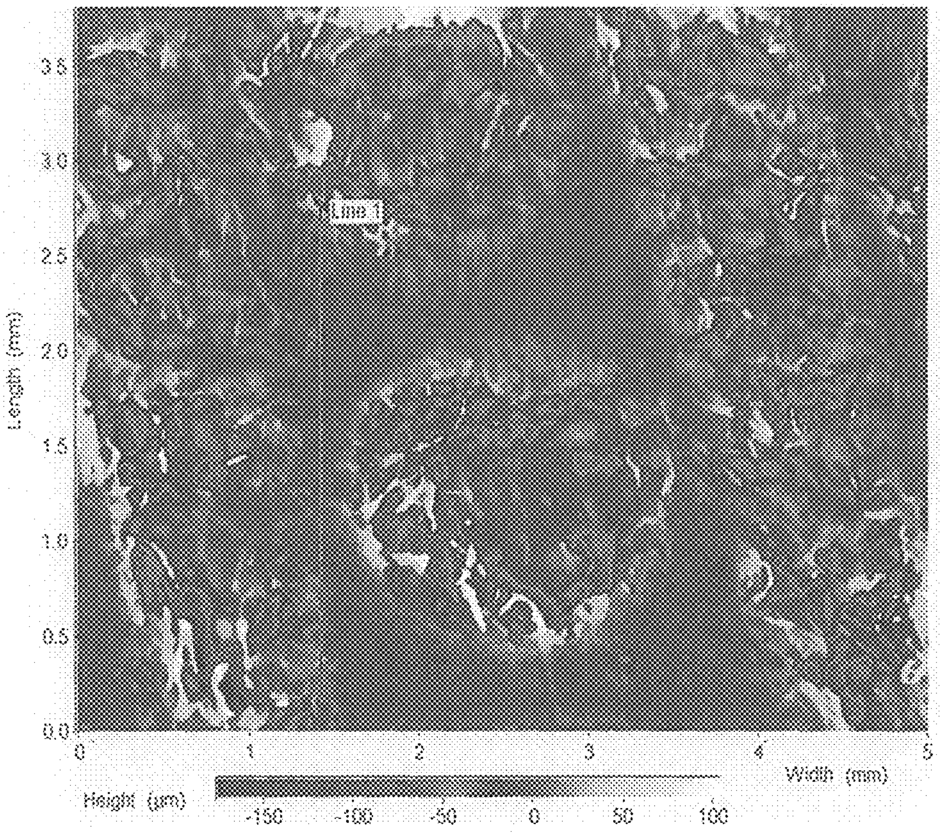
FIG. 20 is an example of a filtered roughness image according to the MikroCAD Test Method.

Referring to FIG. 20, the upper movable fixture 2000 consist of a cylindrical probe 2001 made of machined aluminum with a 19.00±0.05 mm diameter and a length of 38 mm. The end of the cylindrical probe 2002 is hemispheric (radius of 9.50±0.05 mm) with the opposing end 2003 machined to fit the crosshead of the tensile tester. The fixture includes a locking collar 2004 to stabilize the probe and maintain alignment orthogonal to the lower fixture. The lower stationary fixture 2100 is an aluminum fork with vertical prongs 2101 that supports a smooth aluminum sample shaft 2101 in a horizontal position perpendicular to the probe. The lower fixture has a vertical post 2102 machined to fit its base of the tensile tester and also uses a locking collar 2103 to stabilize the fixture orthogonal to the upper fixture.

The sample shaft 2101 has a diameter that is 85% to 95% of the inner diameter of the roll and longer than the width of the roll. The ends of sample shaft are secured on the vertical prongs with a screw cap 2104 to prevent rotation of the shaft during testing. The height of the vertical prongs 2101 should be sufficient to assure that the test roll does not contact the horizontal base of the fork during testing. The horizontal distance between the prongs must exceed the length of the test roll.

Program the tensile tester to perform a compression test, collecting force and crosshead extension data at an acquisition rate of 100 Hz. Lower the crosshead at a rate of 10 mm/min until 5.00 g is detected at the load cell. Set the current crosshead position as the corrected gage length and zero the crosshead position. Begin data collection and lower the crosshead at a rate of 50 mm/min until the force reaches 10 N. Return the crosshead to the original gage length.

Remove all of the test rolls from their packaging and allow them to condition at about 23° C.=2 C.° and about 50%±2% relative humidity for 2 hours prior to testing. Rolls with cores that are crushed, bent or damaged should not be tested. Insert sample shaft through the test roll's core and then mount the roll and shaft onto the lower stationary fixture. Secure the sample shaft to the vertical prongs then align the midpoint of the roll's width with the probe. Orient the test roll's tail seal so that it faces upward toward the probe. Rotate the roll 90 degrees toward the operator to align it for the initial compression.

Position the tip of the probe approximately 2 cm above the surface of the sample roll. Zero the crosshead position and load cell and start the tensile program. After the crosshead has returned to its starting position, rotate the roll toward the operator 120 degrees and in like fashion acquire a second measurement on the same sample roll.

From the resulting Force (N) verses Distance (mm) curves, read the penetration at 7.00 N as the Roll Firmness and record to the nearest 0.1 mm. In like fashion analyze a total of ten (10) replicate sample rolls. Calculate the arithmetic mean of the 20 values and report Roll Firmness to the nearest 0.1 mm.

Dry Compressive Modulus Test Method

Compression caliper and compressive modulus are determined using a tensile tester (Ex. EJA Vantage, Thwing-Albert, West Berlin NJ) fitted with the appropriate compression fixtures (such as a compression foot that has an area of 6.45 cm and an anvil that has an area of 31.67 cm). The thickness (caliper in mils) is measured at various pressure values ranging from 10-1500 g/in$^2$ in both the compression and relaxation directions.

Condition the samples by placing them out on a flat surface, no more than 2 layers high, in a room at standard conditioning temperature and pressure for a minimum of 10 minutes. For large samples (larger than 27.94 cm on each side), measurements are taken at the 4 corners, at least 1.5 cm from the edges. For samples smaller than this, take measurements at least 1.5 cm from the edge on multiple sheets if necessary to record measurements from 4 reps.

Place the sample portion on the anvil fixture. Ensure the sample portion is centered under the foot so that when contact is made the edges of the sample will be avoided. Measure four replicates per sample at a crosshead speed of 0.254 cm/min. The values reported under each pressure value are the compressive caliper values. Report the average of the 4 compressive caliper replicates for each sample.

The thickness (mils) vs. pressure data (g/in$^2$, or gsi) is used to calculate the sample's compressibility, "near-zero load caliper" and compressive modulus. A least-squares linear regressions performed on the thickness vs. the logarithm (base10) of the applied pressure data between and including 10 gsi and 300 gsi. For the 1500 gsi script that is referenced and applied in this method, this involves 9 data points at pressures at 10, 25, 50, 75, 100, 125, 150, 200, 300 gsi and their respective thickness readings. Compressibility (m) equals the slope of the linear regression line, with units of mils/log (gsi). The higher the magnitude of the negative value the more "compressible" the sample is. Near-zero load caliper (b) equals the y-intercept of the linear regression line, with units of mils. This is the extrapolated thickness at log (1 gsi pressure). Compressive Modulus is calculated as the y-intercept divided by the negative slope (−b/m) with units of log (gsi).

Dry Thick Compression=−1* Near-Zero Load Caliper (b) * Compressibility (m), with units of mils*mils/log (gr force/in$^2$). Multiplication by −1 turns formula into a positive. Larger results represent thick products that compress when a pressure is applied.

Dry Thick Compressive Recovery=−1* Near-Zero Load Caliper (b) * Compressibility (m) * Recovered thickness at 10 g/in$^2$/Compressed thickness at 10 g/in$^2$, with units of mils*mils/log (g force/in$^2$). Multiplication by −1 turns formula into a positive. Larger results represent thick products that compress when a pressure is applied and maintain fraction recovery at 10 g/in$^2$. Compressed thickness at 10 g/in$^2$ is the thickness of the material at 10 g/in$^2$ pressure during the compressive portion of the test. Recovered thickness at 10 g/in$^2$ is the thickness of the material at 10 g/in$^2$ pressure during the recovery portion of the test.

Report the thickness readings to the nearest 0.1 mils for the average of the 4 replicate measurements for each compression pressures of interest. Report the average of the 4 replicate measurements for each calculated value: slope to the nearest 0.01 mils/log (gsi); near-zero load caliper to the nearest 0.1 mils and compressive modulus to the nearest 0.01 log (gsi).

Micro-CT Test Method

The micro-CT measurement method measures the basis weight and thickness values within visually discernible region (zone), for example a pillow region (pillow zone) of a fibrous structure sample. It is based on analysis of a 3D x-ray sample image obtained on a micro-CT instrument (a suitable instrument is the Scanco µCT 50 available from Scanco Medical AG, Switzerland, or equivalent). The micro-CT instrument is a cone beam microtomograph with a shielded cabinet. A maintenance free x-ray tube is used as the source with an adjustable diameter focal spot. The x-ray beam passes through the sample, where some of the x-rays are attenuated by the sample. The extent of attenuation correlates to the mass of material the x-rays have to pass through. The transmitted x-rays continue on to the digital detector array and generate a 2D projection image of the sample. A 3D image of the sample is generated by collecting several individual projection images of the sample as it is rotated, which are then reconstructed into a single 3D image. The instrument is interfaced with a computer running software to control the image acquisition and save the raw data. The 3D image is then analyzed using image analysis software (a suitable image analysis software is MATLAB available from The Mathworks, Inc., Natick, MA, or equivalent) to measure the basis weight, thickness and density intensive properties of regions within the sample.

a. Sample Preparation:

To obtain a sample for measurement, lay a single layer of the dry substrate material out flat and die cut a circular piece with a diameter of 30 mm. If the substrate material is in the form of a wet wipe, open a new package of wet wipes and remove the entire stack from the package. Remove a single wipe from the middle of the stack, lay it out flat and allow it to dry completely prior to die cutting the sample for analysis. A sample may be cut from any location containing the region to be analyzed. A region to be analyzed is one where there are visually discernible changes in texture, elevation, or thickness. Regions within different samples taken from the same substrate material can be analyzed and compared to each other. Care should be taken to avoid folds, wrinkles or tears when selecting a location for sampling.

b. Image Acquisition:

Set up and calibrate the micro-CT instrument according to the manufacturer's specifications. Place the sample into the appropriate holder, between two rings of low density material, which have an inner diameter of 25 mm. This will allow the central portion of the sample to lay horizontal and be scanned without having any other materials directly adjacent to its upper and lower surfaces. Measurements should be taken in this region. The 3D image field of view is approximately 35 mm on each side in the xy-plane with a resolution of approximately 3500 by 3500 pixels, and with a sufficient number of 10 micron thick slices collected to fully include the z-direction of the sample. The reconstructed 3D image resolution contains isotropic voxels of 10 microns. Images are acquired with the source at 45 kVp and 200 μA with no additional low energy filter. These current and voltage settings may be optimized to produce the maximum contrast in the projection data with sufficient x-ray penetration through the sample, but once optimized held constant for all substantially similar samples. A total of 1500 projections images are obtained with an integration time of 1000 ms and 3 averages. The projection images are reconstructed into the 3D image, and saved in 16-bit RAW format to preserve the full detector output signal for analysis.

c. Image Processing:

Load the 3D image into the image analysis software. Threshold the 3D image at a value which separates, and removes, the background signal due to air, but maintains the signal from the sample fibers within the substrate.

Three 2D intensive property images are generated from the threshold 3D image. The first is the Basis Weight Image. To generate this image, the value for each voxel in an xy-plane slice is summed with all of its corresponding voxel values in the other z-direction slices containing signal from the sample. This creates a 2D image where each pixel now has a value equal to the cumulative signal through the entire sample.

In order to convert the raw data values in the Basis Weight Image into real values a basis weight calibration curve is generated. Obtain a substrate that is of substantially similar composition as the sample being analyzed and has a uniform basis weight. Follow the procedures described above to obtain at least ten replicate samples of the calibration curve substrate. Accurately measure the basis weight, by taking the mass to the nearest 0.0001 g and dividing by the sample area and converting to grams per square meter (gsm), of each of the single layer calibration samples and calculate the average to the nearest 0.01 gsm. Following the procedures described above, acquire a micro-CT image of a single layer of the calibration sample substrate. Following the procedure described above process the micro-CT image, and generate a Basis Weight Image containing raw data values. The real basis weight value for this sample is the average basis weight value measured on the calibration samples. Next, stack two layers of the calibration substrate samples on top of each other, and acquire a micro-CT image of the two layers of calibration substrate. Generate a basis weight raw data image of both layers together, whose real basis weight value is equal to twice the average basis weight value measured on the calibration samples. Repeat this procedure of stacking single layers of the calibration substrate, acquiring a micro-CT image of all of the layers, generating a raw data basis weight image of all of the layers, the real basis weight value of which is equal to the number of layers times the average basis weight value measured on the calibration samples. A total of at least four different basis weight calibration images are obtained. The basis weight values of the calibration samples must include values above and below the basis weight values of the original sample being analyzed to ensure an accurate calibration. The calibration curve is generated by performing a linear regression on the raw data versus the real basis weight values for the four calibration samples. This linear regression must have an R2 value of at least 0.95, if not repeat the entire calibration procedure. This calibration curve is now used to convert the raw data values into real basis weights.

The second intensive property 2D image is the Thickness Image. To generate this image the upper and lower surfaces of the sample are identified, and the distance between these surfaces is calculated giving the sample thickness. The upper surface of the sample is identified by starting at the uppermost z-direction slice and evaluating each slice going through the sample to locate the z-direction voxel for all pixel positions in the xy-plane where sample signal was first detected. The same procedure is followed for identifying the lower surface of the sample, except the z-direction voxels located are all the positions in the xy-plane where sample signal was last detected. Once the upper and lower surfaces have been identified they are smoothed with a 15×15 median filter to remove signal from stray fibers. The 2D Thickness Image is then generated by counting the number of voxels that exist between the upper and lower surfaces for each of the pixel positions in the xy-plane. This raw thickness value is then converted to actual distance, in microns, by multiplying the voxel count by the 10 μm slice thickness resolution.

d. Micro-CT Basis Weight and Thickness Determination:

Begin by identifying the boundary of the region to be analyzed. The boundary of a region is identified by visual discernment of differences in intensive properties when compared to other regions within the sample. For example, a region boundary can be identified based by visually discerning a thickness difference when compared to another region in the sample, for example the thickness difference between a pillow and a knuckle in a fibrous structure. Any of the intensive properties can be used to discern region boundaries on either the physical sample itself of any of the micro-CT intensive property images.

Once the boundary of the region has been identified draw the largest circular region of interest that can be inscribed within the region. From each of the three intensive property images calculate the average basis weight, thickness and density within the region of interest. Record these values as the region's micro-CT basis weight to the nearest 0.01 gsm and micro-CT thickness to the nearest 0.1 micron, respectively.

MikroCAD Test Method

Knuckle Creping Frequency and Knuckle Roughness Ra and Knuckle Roughness Rq parameters of a fibrous structure, can be identified and/or measured using a LMI Mikrocad Optical Profiler instrument commercially available from LMI Technologies, Warthestraße 21, D14513 Teltow/Berlin, Germany (GFM GmbH was acquired by LMI Technologies in 2015).

The LMI Mikrocad Optical Profiler instrument includes a compact optical measuring sensor based on the digital micro mirror projection, consisting of the following main components: a) DLP projector with 1024×768 direct digital controlled micro mirrors, b) CCD camera with high resolution (4×4 microns), c) projection optics adapted to a measuring area of at least 5 mm×4 mm; d) a table tripod based on a small hard stone plate; e) a blue LED light source; f) a measuring, control, and evaluation computer running ODSCAD software (version 6.2, or equivalent); and g) calibration plates for lateral (x-y) and vertical (z) calibration available from the vendor.

The LMI Mikrocad Optical Profiler system measures the surface height of a fibrous structure sample using the digital micro-mirror pattern projection technique. The result of the analysis is a map of surface height (z) vs. xy displacement. The system has a field of view of 5 mm×4 mm. The height resolution is set at 0.1 micron/count, with a height range of +/−1 mm.

The Knuckle Creping Frequency and Knuckle Roughness Ra and Knuckle Roughness Rq of different portions of a surface of a fibrous structure can be visually determined via a topography image, which is obtained for each fibrous structure sample as described below. At least three samples are measured.

To make the measurements, collect an image of a surface of fibrous structure, such as a surface pattern or portion of a surface pattern on a surface of a fibrous structure, the following is performed: (1) Turn on the computer and monitor and open the ODSCAD 6.2 or higher Mikrocad Software; (2) Select "Measurement" icon from the Mikrocad taskbar and then click the "Live Pic" button; (3) Calibrate the instrument according to manufacturer's specifications using the calibration plates for lateral (x-y axis) and vertical (z axis) available from the vendor; (4) Place a fibrous structure sample of at least 5 cm by 5 cm in size on the table within the camera field of view, so that only the sample surface is visible in the image; (5) Place a glass slide (at least 75 mm by 50 mm in size, 0.9 mm thick) on the sample to ensure the sample lays flat with minimal wrinkles; (6) Click the "Pattern" button repeatedly to project one of several focusing patterns to aid in achieving the best focus (the software cross hair should align with the projected cross hair when optimal focus is achieved). Position the projection head to be normal to the fibrous structure sample surface; (6) Adjust image brightness by changing the aperture on the camera lens and/or altering the camera "gain" setting on the screen. Set the gain to the lowest practical level while maintaining optimum brightness so as to limit the amount of electronic noise. When the illumination is optimum, the red circle at bottom of the screen labeled "I.O." will turn green; (7) Select Standard measurement type; (8) Click on the "Measure" button. This will freeze the live image on the screen and, simultaneously, the surface capture process will begin. It is important to keep the sample still during this time to avoid blurring of the captured images. The full digitized surface data set will be captured in approximately 20 seconds; (9) Save the data to a computer file with ".omc" extension. This will also save the camera image file ".kam". This image is referred to as the "height image."

To measure the Knuckle Creping Frequency and Knuckle Roughness Ra and Knuckle Roughness Rq of a surface of a fibrous structure, for example a surface pattern or portion of a surface pattern on a surface of a fibrous structure, load the height image captured above into the analysis portion of the software via the clipboard. The following filtering procedure is then performed on each height image: (1) removal of invalid points; (2) Band-pass filter (Filter 1: 1×1 pixels, Filter 2: 101×101 pixels, X+Y); (3) Gaussian filter (50×50 pixels, X+Y); (4) Click on the icon "Draw Lines". Draw a line ("Line 1") in the machine direction of the fibrous structure as shown in FIG. 20 at least 2 mm in length through the center of a knuckle region of features defining the texture of interest and perpendicular to the crepe features. Click on Show Sectional Line icon; (5) Align the graph and open the window to calculate roughness parameters. Record the line Knuckle Roughness Ra and Knuckle Roughness Rq values to the nearest 0.1 μm. Save a copy of the "filtered roughness image" an example of which is shown in FIG. 20 and export the data. Repeat this procedure for the remaining replicate samples. Average together the replicate Knuckle Roughness Ra values and report to the nearest 0.1 μm. Average together the replicate Knuckle Roughness Rq values and report to the nearest 0.1 μm (6) For Knuckle Creping Frequency, count the number of x-intercepts in the graph, divide by 2, and then divide by the line length. Repeat this procedure for the remaining replicate samples. Average together the replicate Knuckle Creping Frequency values and report to the nearest 0.1 #/mm.

The dimensions and/or values disclosed herein are not to be understood as being strictly limited to the exact numerical dimension and/or values recited. Instead, unless otherwise specified, each such dimension and/or value is intended to mean both the recited dimension and/or value and a functionally equivalent range surrounding that dimension and/or value. For example, a dimension disclosed as "40 mm" is intended to mean "about 40 mm".

Every document cited herein, including any cross referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A creped fibrous structure, comprising:

an elongate knuckle comprising a perimeter;

a first pillow and a second pillow;

wherein the first and second pillows are discrete from each other;

wherein the first pillow exhibits a bulk building capability of greater than 16 cc/g; and wherein the creped fibrous structure has a Knuckle Roughness Ra of less than 9.00 μm as measured according to the MikroCAD Test Method.

2. The fibrous structure according to claim 1, wherein the first pillow exhibits a bulk building capability of greater than 17 cc/g.

3. The fibrous structure according to claim 1, wherein the fibrous structure exhibits a wet caliper normalized for basis weight of greater than 0.65 mils/(lb./3000 ft$^2$) as measured according to the Caliper Test Method.

4. The fibrous structure according to claim 1, wherein the fibrous structure is in roll form such that the roll of fibrous structure exhibits a Roll Compressibility of from about 0.5% to about 15% as measured according to the Roll Compressibility Test Method.

5. The fibrous structure according to claim 1, wherein the fibrous structure is in roll form such that the roll of fibrous structure exhibits a Roll Firmness of from about 2.5 mm to about 15 mm as measured according to the Roll Firmness Test Method.

6. The fibrous structure according to claim 1, wherein the fibrous structure is in roll form such that the roll of fibrous structure exhibits a Roll Compressibility of from about 0.5% to about 15% as measured according to the Roll Compressibility Test Method, a roll bulk of about 4 cm$^3$/g to about 30 cm$^3$/g, and a Roll Firmness of from about 2.5 mm to about 15 mm as measured according to the Roll Firmness Test Method.

7. The creped fibrous structure according to claim 1, comprising a basis weight of from 50 g/m$^2$ (30.8 lbs/3000 ft$^2$) to 110 g/m$^2$ (67.7 lbs/3000 ft$^2$).

8. The creped fibrous structure according to claim 1, comprising a Knuckle Creping Frequency of less than 5.5 #/mm as measured by the MikroCAD Test Method.

9. The fibrous structure according to claim 1, wherein each of the first and second pillows are within the perimeter of the elongate knuckle.

10. The fibrous structure according to claim 1, exhibiting a basis weight of from about 55 g/m$^2$ (33.8 lbs/3000 ft$^2$) to about 105 g/m$^2$ (64.6 lbs/3000 ft$^2$).

11. The fibrous structure according to claim 1, exhibiting a basis weight of from about 60 g/m$^2$ (36.9 lbs/3000 ft$^2$) to about 100 g/m$^2$ (61.5 lbs/3000 ft$^2$).

12. The fibrous structure according to claim 1, exhibiting a Knuckle Roughness Rq of less than 8.00 μm.

* * * * *